United States Patent
Tamura et al.

(10) Patent No.: US 7,270,928 B2
(45) Date of Patent: Sep. 18, 2007

(54) ISOCYANATE COMPOSITION, MICROCAPSULE AND PRODUCTION METHOD THEREOF, AND RECORDING MATERIAL

(75) Inventors: Takashi Tamura, Shizouka-ken (JP); Koreshige Ito, Shizouka-ken (JP)

(73) Assignee: Fujifilm Corporation, Tokyo (JP)

( * ) Notice: Subject to any disclaimer, the term of this patent is extended or adjusted under 35 U.S.C. 154(b) by 299 days.

(21) Appl. No.: 11/029,428

(22) Filed: Jan. 6, 2005

(65) Prior Publication Data

US 2005/0153839 A1    Jul. 14, 2005

(30) Foreign Application Priority Data

Jan. 8, 2004  (JP) ............................. 2004-003314
May 25, 2004  (JP) ............................. 2004-155000

(51) Int. Cl.
 *G03F 7/021*    (2006.01)
 *C08L 71/00*    (2006.01)

(52) U.S. Cl. ...................... 430/138; 430/157; 430/171; 525/94; 525/123; 525/127; 525/218; 525/222; 525/223; 525/230; 503/215

(58) Field of Classification Search ................ 430/138, 430/157, 171; 503/215; 525/94, 123, 127, 525/218, 222, 223, 230
See application file for complete search history.

(56) References Cited

U.S. PATENT DOCUMENTS 5,342,556 A    8/1994    Traubel et al.
5,916,680 A    6/1999    Wakata et al.
7,163,997 B2 *  1/2007    Yumoto et al. ............. 528/371
2004/0091810 A1 *  5/2004    Yumoto et al. ............. 430/138

FOREIGN PATENT DOCUMENTS

| JP | 62-212190 A | 9/1987 |
| JP | 2-141279 A | 5/1990 |
| JP | 4-261893 A | 1/1992 |
| JP | 5-317694 A | 12/1993 |
| JP | 6-55546 A | 3/1994 |
| JP | 9-39389 A | 2/1997 |
| JP | 10-114153 A | 5/1998 |
| JP | 3266330 B2 | 1/2002 |

\* cited by examiner

*Primary Examiner*—John S. Chu
(74) *Attorney, Agent, or Firm*—Sughrue Mion, PLLC

(57) ABSTRACT

The present invention provides an isocyanate composition including an adduct of a multifunctional isocyanate compound having two or more isocyanate groups in the molecule thereof with a polymer obtained by radically polymerizing in the presence of a chain transfer agent having active hydrogen at least a vinyl monomer including a polymerizable compound having a polyether represented by the following Formula (I):

$$A^1\text{-}(L\text{-}O)_n\text{-}B^1 \qquad \text{Formula (I)}$$

wherein $A^1$ represents a group having an ethylenically unsaturated double bond; L represents an alkylene group; $B^1$ represents an alkyl group or an aryl group; and n is an average polymerization degree of the polyether and represents a number of 8 to 300.

13 Claims, No Drawings

ISOCYANATE COMPOSITION, MICROCAPSULE AND PRODUCTION METHOD THEREOF, AND RECORDING MATERIAL

CROSS-REFERENCE TO RELATED APPLICATION

This application claims priority under 35 USC 119 from Japanese Patent Application Nos. 2004-3314 and 2004-155000, the disclosures of which are incorporated by reference herein.

BACKGROUND OF THE INVENTION

1. Field of the Invention

The present invention relates to a novel isocyanate composition, microcapsules made from the isocyanate composition and a recording material including the microcapsules, and a production method of the microcapsules.

2. Description of the Related Art

Polyvalent isocyanate compounds are widely used as raw materials for polyurethanes, polyurea resins and urethane elastomers. Polyvalent isocyanate compounds are also useful as a wall material for producing microcapsules by interfacial polymerization. The resultant microcapsules are used in pressure sensitive recording materials, thermosensitive recording materials and adhesives.

Materials obtained by applying a solid dispersion including mainly an electron-donating dye precursor to a substrate and drying the resultant coating are used as thermosensitive recording materials, which prevail as recording media for facsimiles and printers. Recording methods which include the use of electron-donating dye precursors are advantageous in that materials are readily available and exhibit high color development concentration and high sensitivity to heat. However, undesired coloring easily occurs depending on the storage conditions after recording, application of heat or adhesion of solvent. In other words, the recording materials have problems regarding storability and reliability of recorded images. Accordingly, research to solve such problems has been ernestly conducted.

As a method for improving storability of recorded images, a method was suggested in which storability of images is enhanced by encapsulating the electron-donating dye precursor and isolating the dye precursor from a developer in a recording layer. This method can provide a high color development ability and image stability.

Besides the above-mentioned thermosensitive recording materials, thermosensitive recording materials utilizing diazonium salt compounds, so-called diazo-type thermosensitive recording materials, has been put to practical use. Diazonium salt compounds react with a coupler such as a phenol derivative, or a compound having an active methylene group to form a dye. However diazonium salt compounds also are photosensitive, and so, when irradiated with light, they lose the above reactivity. Because of such characteristics diazonium salt compounds have been recently applied to thermosensitive recording materials, and photofixed thermosensitive recording materials are proposed, in which, when the materials are heated, a diazonium salt is caused to react with a coupler so as to form an image, and the image is then fixed by irradiating the materials with light (e.g., see Koji Sato et al., "Journal of the Institute of Image Electronics Engineers of Japan" (Vol. 11, 4th, pp. 290-296, 1982).

However, recording materials including a diazonium salt compound have high chemical activity and diazonium salt compounds gradually react with couplers even at low temperature, giving the disadvantage of a short shelf life of the recording materials. In order to solve this problem, a method was suggested, in which a diazonium salt compound is encapsulated in microcapsules to separate the compound from couplers, water and basic compounds (e.g., see Tomomasa Usami et al., "Journal of the Image Society of Japan" (Vol. 26, 2nd, pp. 115-125, 1987).

Multicolor thermosensitive recording materials have also drawn attention as applicable to the field of thermosensitive recording materials. Reproduction of a multicolor image by using thermosensitive recording was thought to be more difficult than by using electrophotographic recording or ink-jet recording. However, it has become apparent that multicolor thermosensitive recording materials can be obtained by laminating, on a substrate, two or more thermosensitive recording layers including, as main components, an electron-donating dye precursor and a developer. Alternatively, two or more thermosensitive recording layers including a diazonium salt compound and a coupler which, when heated, reacts with the diazonium salt compound to develop color can be used. In order to obtain excellent color reproductibity, such multicolor thermosensitive recording materials require precise control of the heat responsiveness of the microcapsules by which, when heated, the microcapsules allow materials inside and/or outside the microcapsules to permeate the microcapsules.

An example, which is well known, of a method for encapsulating in microcapsules an electron-donating dye precursor or a diazonium salt compound is the following. An electron-donating dye precursor or diazonium salt can be dissolved in an organic solvent (the oil phase), and then added to an aqueous solution (aqueous phase) including a water-soluble polymer, and then emulsification-dispersed. By adding a wall material monomer or prepolymer, to either the resultant oil phase or aqueous phase, polymer walls serving as microcapsules can be formed at the boundary between the oil phase and the aqueous phase (e.g., see Tomoji Kondo, "Microcapsules" (The Nikkan Kogyo Shimbun, Ltd., 1970) and Yasushi Kondo et al., "Microcapsules" (Sankyo Shuppan, 1977)). The microcapsule walls can be made of gelatin, alginate, celluloses, polyurea, polyurethane, melamine resin or nylon. Polyurea and polyurethane resins are particularly preferably useful in the design of thermosensitive recording materials, because they have a glass transition temperature in the range from room temperature to about 200° C., which enables the capsule walls to show heat responsiveness.

In order to obtain microcapsules having polyurethane or polyurea walls, a production method conventionally conducted is the following. A diazonium salt or an electron-donating dye precursor is dissolved in an organic solvent, a polyvalent isocyanate compound is added to the resultant solution, and the resultant organic phase solution is emulsified and/or dispersed in an aqueous solution including a water-soluble polymer. A catalyst to accelerate polymerization is added to the aqueous phase or the temperature of the resultant emulsion is raised to cause the polyvalent isocyanate compound to react with a compound having an active hydrogen, such as water, and to form capsule walls.

As the polyvalent isocyanate compound, which is one of the raw materials of polyurea or polyurethane walls, for example, an adduct of 2,4-tolylenediisocyanate and trimethylolpropane, or an adduct of xylylenediisocyanate and trimethylolpropane are known (e.g., Japanese Patent Application Laid-Open (JP-A) Nos. 62-212190 and 04-026189).

However, even having polyurea or polyurethane capsule walls, one of raw materials of which is the polyvalent isocyanate compound, insufficiently lengthens the shelf life of recording materials including diazonium salt compounds. When thermosensitive recording materials having insufficiently long shelf life are stored, for example, at a high temperature and a high humidity before actual use thereof, they undesirably develop coloring called "fogging" of the background thereof, which deteriorates the visibility of recorded images. One answer to such a problem is to thicken the microcapsule walls. However, this solution deteriorates the color development sensitivity during thermal recording. Accordingly, it is extremely difficult to attain both high color development ability whilst further increasing shelf life.

As one method for solving such a problem, a method using a product obtained by causing a part of the polyvalent isocyanate compound to react in advance with a monoalcohol compound is known (e.g., see JP-A No. 05-317694). However, specific examples of the only monoalcohols having about 2 to about 9 carbon atoms are used in this method. In addition, when the proportion of alcohol is increased, sensitivity does increase but "fogging" also increases. "Fogging" can be prevented by decreasing the proportion of alcohol, but sensitivity becomes insufficient.

In addition, multicolor thermosensitive recording materials have cyan, magenta and yellow colors-forming thermosensitive recording layers, and respective color images are recorded on the materials by heating the materials to different corresponding temperatures. Therefore, the recording layers of multicolor thermosensitive recording materials are required to have more precise heat responsiveness than those of conventional thermosensitive recording materials. However, the above-mentioned conventional polyurea and polyurethane capsule walls do not satisfy this requirement.

It is known that addition of a heat sensitizer to the color development layer of a thermosensitive recording material improves sensitivity to heat. It is known that p-toluene sulfonamide, a heat sensitizer, show good performance (e.g., see Japanese Patent Publication (JP-B) No. 06-055546). In addition, it is known that arylsulfonamide compounds having specific substituent(s) shows better performance (e.g., see JP-A No. 09-039389). When the above arylsulfonamide compounds are used in multicolor thermosensitive recording materials, it is necessary to emulsify the arylsulfonamide compound to decrease haze of the thermosensitive color development layer. A method for emulsifying the arylsulfonamide compound is not specifically limited, and can be a conventionally known method. Specifically, an emulsion is made by dissolving the arylsulfonamide compound in an organic solvent hardly soluble or insoluble in water, mixing the resultant solution with an aqueous phase including a surfactant and/or, as a protective colloid, a water-soluble polymer and stirring the resultant mixture (e.g., see JP-A No. 02-141279).

The heat sensitizer is generally a crystalline substance. Therefore, when the emulsion including the heat sensitizer is stored for a long period of time, problems such as the crystals precipitating out from the emulsion may occur. Accordingly, microcapsules having sufficient sensitivity to heat without the use of such a heat sensitizer or only the use of a small amount of such a heat sensitizer are strongly desired.

From these viewpoints, heat responsible microcapsules made from a polymer obtained by polymerizing an isocyanate compound including an adduct has been suggested (e.g., see JP-A No. 10-114153). In this case the adduct is a compound (A) which has one active hydrogen in the molecule thereof and which has at least one chain with an average molecular weight in the range of 500 to 20000 from the group of a polyether chain, a polyester chain and a (co)polymer chain of a vinyl monomer. Alternatively, the isocyanate compound is a multifunctional isocyanate (B) having two or more isocyanate groups in the molecule. The publication listed above describes that microcapsules capable of suppressing background fogging and yet having high heat responsiveness can be provided. In addition, microcapsules having polyurea shells whose raw materials include an isocyanate that is a product of at least multifunctional isocyanate and a monovalent polyoxyethylene alcohol are disclosed (e.g., see Japanese Patent No. 3,266,330), and this publication describes that small microcapsules can be provided at low cost for emulsification.

However, although JP-A No. 10-114153 discloses a vinyl monomer as an example of the compound (A), it does not mention specific particular effects which derive from the type of vinyl monomer used. In addition, the publication does not mention at all a vinyl monomer including polyether, which is one of the constitutional elements of the invention.

Accordingly, there is a need for an isocyanate composition that can be used to produce supperior microcapsules suitable for use in thermosensitive recording materials and provides both excellent pre-recording storability (long shelf life), and also is able to produce excellent color development ability by giving good contact of coupler and developer in response to heat.

Also there is a need for a thermosensitive recording material including such microcapsules, having high sensitivity, high developing properties and excellent pre-recording storability (long shelf life). There is a need for a multicolor thermosensitive recording material having high sensitivity, excellent color reproducibility and excellent pre-recording storability. There is a need for a method for forming the above-mentioned useful microcapsules.

SUMMARY OF THE INVENTION

The inventors of the invention have intensively investigated isocyanates used for the production of microcapsules, in view of improvement in shelf life and keeping a high developing property when they are used in thermosensitive recording materials. As a result, they have completed the invention. Specifically, the inventors have intensively investigated vinyl monomers, found that microcapsules having both a high developing property and a low fogging property can be produced by copolymerizing a vinyl monomer including polyether and a specific vinyl monomer, and have completed the invention.

A first aspect of the invention provides an isocyanate composition containing an adduct of a multifunctional isocyanate compound having two or more isocyanate groups in the molecule thereof with a polymer obtained by radically polymerizing in the presence of a chain transfer agent having active hydrogen at least a vinyl monomer including a polymerizable compound having a polyether represented by the following Formula (I):

$$A^1\text{-}(L\text{-}O)_n\text{-}B^1 \qquad \text{Formula (I)}$$

wherein $A^1$ represents a group having an ethylenically unsaturated double bond; L represents an alkylene group; $B^1$ represents an alkyl group or an aryl group; and n is an average polymerization degree of the polyether and represents a number of 8 to 300.

A second aspect of the invention provides a microcapsule having a polyurethane and/or polyurea wall, wherein the capsule wall includes, via a covalent bond, a polymer obtained by radically polymerizing in the presence of a chain transfer agent having active hydrogen at least a vinyl monomer including a polymerizable compound having a polyether represented by the following Formula (I):

$$A^1\text{-}(L\text{-}O)_n\text{-}B^1 \qquad \text{Formula (I)}$$

wherein $A^1$ represents a group having an ethylenically unsaturated double bond; L represents an alkylene group; $B^1$ represents an alkyl group or an aryl group; and n is an average polymerization degree of the polyether and represents a number of 8 to 300.

A third aspect of the invention provides a microcapsule having a polyurethane and/or polyurea wall, made from at least one raw material that include the isocyanate composition of the first aspect.

A fourth aspect of the invention provides a recording material having a recording layer including microcapsules of the second aspect.

A fifth aspect of the invention provides a recording material having a recording layer including microcapsules of the third aspect.

A sixth aspect of the invention provides a thermosensitive recording material having a substrate, and, on the substrate, a thermosensitive recording layer including: a coupler and microcapsules encapsulating a diazonium salt compound; or a developer and microcapsules encapsulating an electron-donating dye precursor; wherein the microcapsules include microcapsules of the second or third aspect.

A seventh aspect of the invention provides a thermosensitive recording material having a substrate, and, on the substrate, cyan, magenta and yellow color-forming thermosensitive recording layers, wherein each of the thermosensitive recording layers includes: a coupler and microcapsules encapsulating a diazonium salt compound; or a developer and microcapsules encapsulating an electron-donating dye precursor; and the microcapsules include microcapsules of the second or third aspect.

An eighth aspect of the invention provides a method of producing microcapsules having polyurethane and/or polyurea walls, including: causing the isocyanate composition of the first aspect to react with a compound having at least one active hydrogen atom.

The novel isocyanate composition of the invention is useful as the wall material of microcapsules, and the microcapsules made from the composition have high sensitivity to heat and, when heated, rapidly enables a coupler and a developer, one of which is inside the microcapsules and the other of which is outside the microcapsules, to permeate the microcapsules, react with each other and develop clear color. When the microcapsules contain, as a core substance, a diazonium salt compound, the microcapsules show excellent properties, such as excellent raw storability (long shelf life), for a long period of time. In addition, a thermosensitive recording material including the microcapsules of the invention has a sufficient developing property, even when the thermosensitive recording material includes no heat sensitizer or a small amount of a heat sensitizer. Accordingly, when the microcapsules of the invention are contained in the thermosensitive recording layer of a thermosensitive recording material, the thermosensitive recording material has a high sensitivity and a high developing property. When a diazonium salt compound is contained in the thermosensitive recording layer, the thermosensitive recording material can also have excellent raw storability. In addition, a multicolor thermosensitive recording material of the invention including the microcapsules in at least one thermosensitive recording layer has a high sensitivity, excellent color reproducibility and excellent raw storability. Furthermore, the invention can provide a method for producing such useful microcapsules.

DETAILED DESCRIPTION OF THE INVENTION

The isocyanate composition of the invention is a novel isocyanate composition including an adduct of a multifunctional isocyanate compound having two or more isocyanate groups in the molecule thereof with a polymer (A) obtained by radically polymerizing in the presence of a chain transfer agent including active hydrogen at least a vinyl monomer including a polymerizable compound having polyether represented by the following Formula (I).

Hereinafter the isocyanate composition of the invention will be described in detail.

Isocyanate Composition

First, a polymerizable compound including a polyether represented by the following Formula (I) will be explained.

$$A^1\text{-}(L\text{-}O)_n\text{-}B^1 \qquad \text{Formula (I)}$$

In Formula (I), $A^1$ represents a group having an ethylenically unsaturated double bond, L represents an alkylene group, $B^1$ represents an alkyl group or an aryl group, and n is an average polymerization degree of the polyether and represents a number of 8 to 300.

Examples of the group having an ethylenically unsaturated double bond represented by $A^1$ include the groups represented by the following Formulas (III), (IV) and (V).

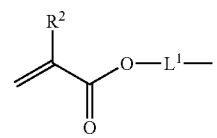

Formula (III)

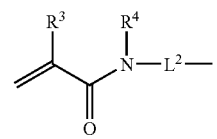

Formula (IV)

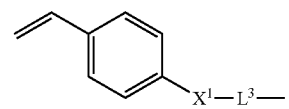

Formula (V)

In the group represented by Formula (III), $R^2$ is a hydrogen atom or a methyl group. $L^1$ is a single bond or —$C^1$—$Y^1$— and $C^1$ is an alkylene group, a group having a divalent functional group in an alkylene chain, or an arylene group and $Y^1$ is —O—, —COO—, —CONH—, —OCO— or —NHCO—. The alkylene group represented by $C^1$ may have one or more substituent or may be branched, and preferably has 2 to 30 carbon atoms, and more preferably 2 to 20 carbon atoms.

When the alkylene group has at least one substituent, examples of the substituent(s) include an aryl group, an alkoxy group, a halogen atom, a cyano group, an alkoxycarbonyl group, an aryloxycarbonyl group, an acylamino group and a carbamoyl group. The acylamino group may be either an aliphatic group or an aromatic group, and the carbamoyl group may have, as a substituent, an alkyl group or an aryl group. The substituent of the alkylene group is more preferably an aryl group, an acylamino group or a carbamoyl group.

The divalent functional group in the alkylene chain is preferably —CO—, —COO—, —OCO—, —CONH—, —NHCO—, —N($R^5$)CON($R^6$)—, —N($R^7$)COO— or —COON($R^8$)—. $R^5$ to $R^8$ are each a hydrogen atom or an alkyl group. The divalent functiona group is more preferably —CONH—, —NHCO—, —N($R^5$)CON($R^6$)—, —N($R^7$)COO— or —COON($R^8$)—.

The arylene group represented by $C^1$ may have one or more substituent, and preferably has 6 to 30 carbon atoms, and more preferably 6 to 20 carbon atoms. When the arylene group has at least one substituent, the substituent is preferably an alkyl group, an alkoxy group, a halogen atom, a cyano group, an alkoxycarbonyl group, an aryloxycarbonyl group, an acylamino group or a carbamoyl group. The acylamino group may be an aliphatic group or an aromatic group, and the carbamoyl group may have, as a substituent, an alkyl group or an aryl group. The substituent of the arylene group is more preferably an aryl group, an acylamino group or a carbamoyl group.

$Y^1$ represents —O—, —COO—, —CONH—, —OCO— or —NHCO—, and is preferably —O—, —COO— or —CONH—. Specific examples of —$C^1$—$Y^1$— are shown below, but the invention is not limited by these groups.

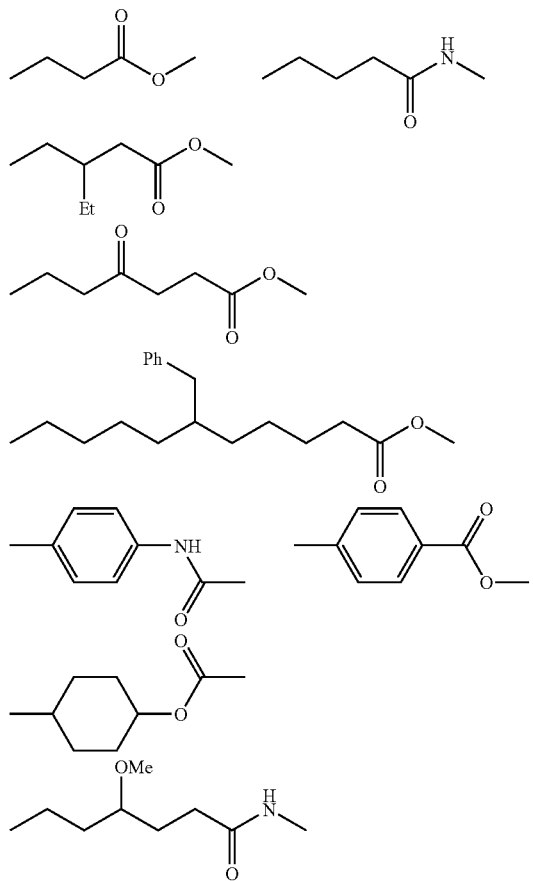

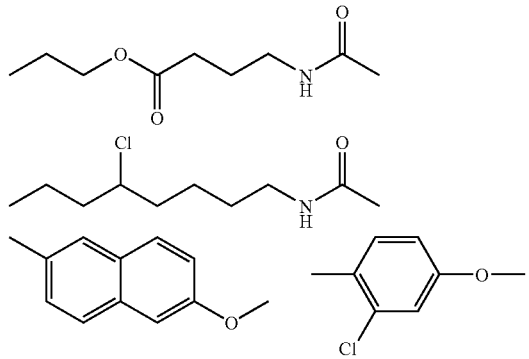

$L^1$ is preferably a single bond.

In the group represented by Formula (IV), $R^3$ is a hydrogen atom or a methyl group, and $R^4$ is a hydrogen atom, an alkyl group or an aryl group. $L^2$ has the same definition as that of $L^1$ in Formula (III).

The alkyl group represented by $R^4$ may have one or more substituent or may be branched, and preferably has 2 to 20 carbon atoms, and more preferably 2 to 15 carbon atoms. When the alkyl has one or more substituent, the substituent is preferably an aryl group, an alkenyl group or an alkoxy group, and more preferably an aryl group. Examples of such an alkyl group include a methyl group, an ethyl group, a propyl group, an iso-propyl group, a butyl group, a s-butyl group, a t-butyl group, a cyclohexyl group, an adamantyl group, a benzyl group and a phenylethyl group.

The aryl group represented by $R^4$ may have one or more substituent, and preferably has 6 to 30 carbon atoms, and more preferably 6 to 20 carbon atoms. When the aryl group has at least one substituent, the substituent is preferably a halogen atom, an alkyl group, an alkenyl group, an alkynyl group or an alkoxy group, and is more preferably an alkyl group or an alkoxy group. Examples of such an aryl group include a phenyl group, a nonylphenyl group, an octylphenyl group, a fluorophenyl group, a phenylethenylphenyl group and a methoxyphenyl group. However, it is preferable that the aryl group has no substituent or has as a substituent an alkyl group. It is more preferable that the aryl group has no substituent.

In the group represented by Formula (V), $X^1$ is a single bond, —O—, —COO—, —CONH—, —OCO— or —NHCO—. $X^1$ is preferably a single bond, —O—, —COO— or —CONH—. $L^3$ has the same definition as that of $L^1$ of Formula (III).

The group having an ethylenically unsaturated double bond represented by $A^1$ is preferably the group represented by Formula (III) or (IV), and more preferably the group represented by Formula (III).

In Formula (I), L is an alkylene group.

The alkylene group represented by L may have one or more substituent or may be branched, and preferably has 2 to 20 carbon atoms, and more preferably 2 to 10 carbon atoms. When the alkylene group has at least one substituent, the substituent is preferably an aryl group, an alkenyl group, an alkoxy group or an acyl group, and more preferably an aryl group. Examples of such an alkylene group include an ethylene group, a propylene group, a tetramethylene group, a phenylethylene group, a cyclohexylene group, a vinylethylene group and a phenoxymethylethylene group.

In Formula (I), $B^1$ is an alkyl group or an aryl group.

The alkyl group represented by $B^1$ may have one or more substituent or may be branched, and preferably has 1 to 30 carbon atoms, and more preferably 1 to 20 carbon atoms. When the alkyl group has at least one substituent, the substituent is preferably an aryl group, an alkenyl group or an alkoxy group. Examples of such an alkyl group include a methyl group, an ethyl group, a butyl group, an iso-propyl group, a benzyl group, an allyl group, an oleyl group and a methoxyethyl group.

The aryl group represented by $B^1$ may have one or more substituent, and preferably has 6 to 30 carbon atoms, and more preferably 6 to 20 carbon atoms. When the aryl group has at least one substituent, the substituent is preferably a halogen atom, an alkyl group, an alkenyl group, an alkynyl group or an alkoxy group, and more preferably an alkyl group or an alkoxy group. Examples of such an aryl group include a phenyl group, a nonylphenyl group, an octylphenyl group, a fluorophenyl group, a phenylethenylphenyl group and a methoxyphenyl group.

In Formula (I), n is the average polymerization degree of the polyether and a number of 8 to 300. n is preferably a number of 8 to 200.

The number of the repeating unit(s) (-L-O—) is n, and the repeating units may be the same or different. Examples of the polyether having such a repeating unit include polyethylene oxide, polypropylene oxide, polytetramethylene oxide, polystyrene oxide, polycyclohexylene oxide, polyethylene oxide-polypropylene oxide block copolymers and polyethylene oxide-polypropylene oxide random copolymers. The polyether is preferably polyethylene oxide, polypropylene oxide or polytetramethylene oxide.

Specific examples of the compound represented by Formula (I) are shown below, but the invention is not limited by these examples.

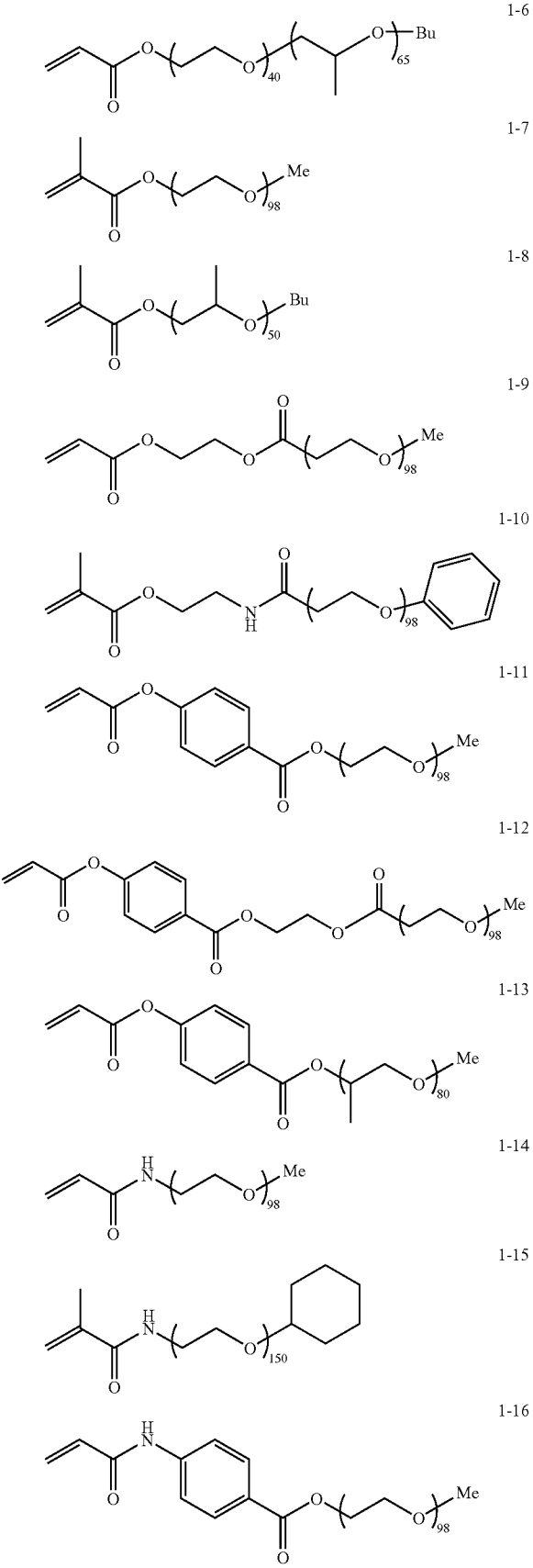

-continued

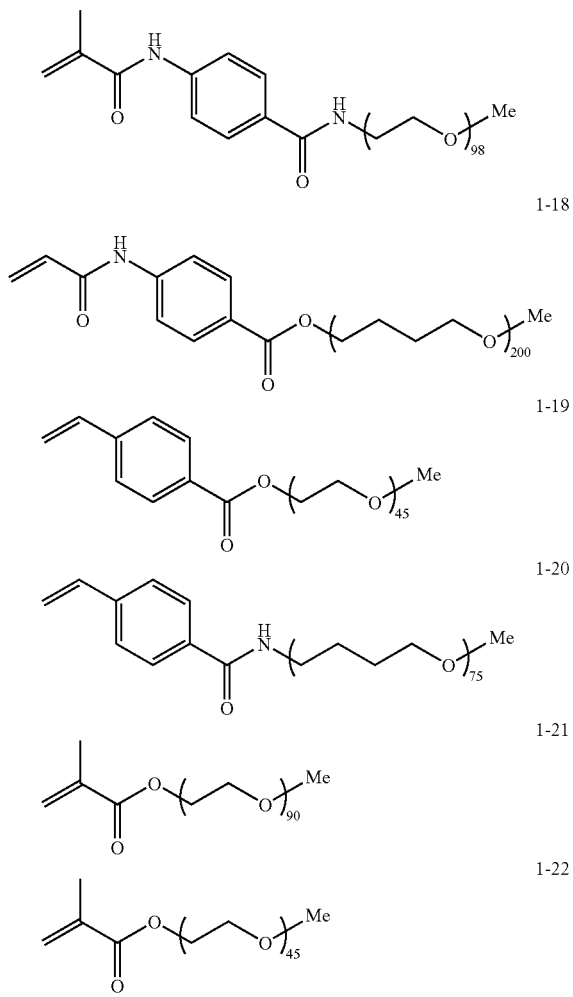

1-17

1-18

1-19

1-20

1-21

1-22

The radical polymer, which is the polymer (A) in the invention, is a homopolymer of the polymerizable compound represented by Formula (I), or a copolymer of the polymerizable compound represented by Formula (I) and any other copolymerizable compound.

Second, the compound copolymerizable with the polymerizable compound represented by Formula (I) will be explained. Examples of such a copolymerizable compound include a compound represented by the following Formula (II), vinyl chloride and (meth)acrylonitrile.

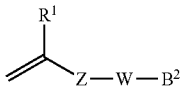

Formula (II)

In Formula (II), $R^1$ is a hydrogen atom or a methyl group, and Z is —O—, —CO—, —COO—, —CON($R^5$)— or a phenylene group, and $R^5$ is a hydrogen atom, an alkyl group or an aryl group.

The alkyl group represented by $R^5$ may have one or more substituent or may be branched, or may bond to W described later so as to form a ring group, and preferably has 1 to 20 carbon atoms, and more preferably 1 to 15 carbon atoms. When the alkyl group has at least one substituent, the substituent is preferably an aryl group, an alkenyl group or an alkoxy group, and more preferably an aryl group.

The aryl group represented by $R^5$ may have one or more substituent, and preferably has 6 to 30 carbon atoms, and more preferably 6 to 20 carbon atoms. When $R^5$ forms a ring, the ring is preferably a 5 to 7-membered ring, and more preferably a 5 or 6-membered ring. When $R^5$ has at least one substituent, the substituent is preferably a halogen atom, an alkyl group, an alkenyl group, an alkynyl group or an alkoxy group, and more specifically an alkyl group or an alkoxy group.

$R^5$ is still more preferably a hydrogen atom or an alkyl group.

Specific examples of the group represented by $R^5$ include a hydrogen atom, a methyl group, an ethyl group, a methoxypropyl group, a phenyl group and a naphthyl group.

The phenylene group represented by Z may have one or more substituent, and preferably has 6 to 30 carbon atoms, and more preferably 6 to 20 carbon atoms. When the phenylene group has at least one substituent, examples of the substituent include an alkyl group, an aryl group, an alkoxy group, a halogen atom, a cyano group, an alkoxycarbonyl group, an aryloxycarbonyl group, an acylamino group and a carbamoyl group. The acylamino group may be an aliphatic group or an aromatic group, and the carbamoyl group may have, as a substituent, an alkyl group or an aryl group. The substituent of the phenylene group is preferably an alkyl group, an aryl group, an alkoxy group or a cyano group.

Z is preferably —COO—, —CON($R^5$)— or a phenylene group.

In Formula (II), W is a single bond or —$C^2$—$Y^2$—, and $C^2$ is an alkylene group, a group having a divalent functional group in an alkylene chain or an arylene group, and $Y^2$ is a single bond, —O—, —COO—, —CONH—, —OCO— or —NHCO—.

The alkylene group represented by $C^2$ may have one or more substituent or may be branched, and preferably has 2 to 30 carbon atoms, and more preferably 2 to 20 carbon atoms. When the alkylene group has at least one substituent, examples of the substituent include an aryl group, an alkoxy group, a halogen atom, a cyano group, an alkoxycarbonyl group, an aryloxycarbonyl group, an acylamino group and a carbamoyl group. The acylamino group may be an aliphatic group or an aromatic group, and the carbamoyl group may have, as a substituent, an alkyl group or an aryl group. The substituent of the alkylene group is preferably an aryl group, an acylamino group or a carbamoyl group.

The divalent functional group in the alkylene chain is preferably —CO—, —COO—, —OCO—, —CONH—, —NHCO—, —N($R^9$)CON($R^{10}$)—, —N($R^{11}$)COO— or —COON($R^{12}$)—, and more preferably —CONH—, —NHCO—, —N($R^9$)CON($R^{10}$)—, —N($R^{11}$)COO—or —COON($R^{12}$)—. Each of $R^9$ to $R^{12}$ is a hydrogen atom or an alkyl group.

The arylene group represented by $C^2$ may have one or more substituent, and preferably has 6 to 30 carbon atoms, and more preferably 6 to 20 carbon atoms. When the arylene group has at least one substituent, the substituent is preferably an alkyl group, an alkoxy group, a halogen atom, a cyano group, an alkoxycarbonyl group, an aryloxycarbonyl group, an acylamino group or a carbamoyl group. The acylamino group may be an aliphatic group or an aromatic group, and the carbamoyl group may have, as a substituent, an alkyl group or an aryl group. The substituent of the arylene group is more preferably an aryl group, an acylamino group or a carbamoyl group.

$Y^2$ represents a single bond, —O—, —COO—, —CONH—, —OCO— or —NHCO—. $Y^2$ is preferably a single bond, —O—, —COO— or —CONH—.

$C^2$ is preferably an alkylene group.

Spesific examples of —$C^2$—$Y^2$— include the following groups.

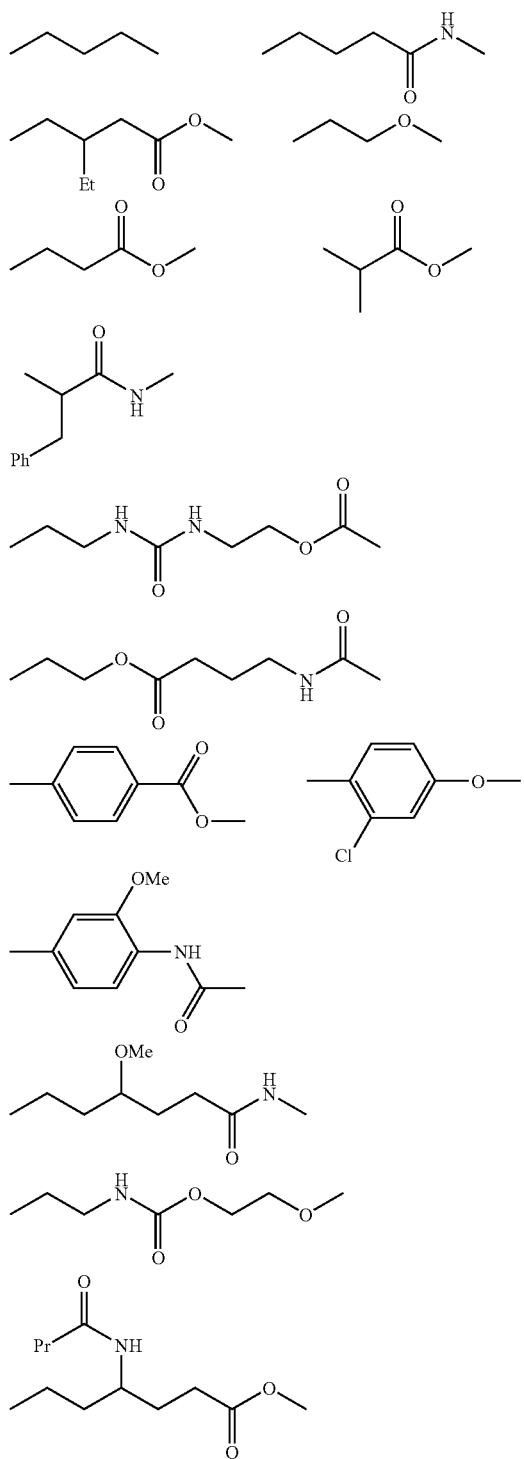

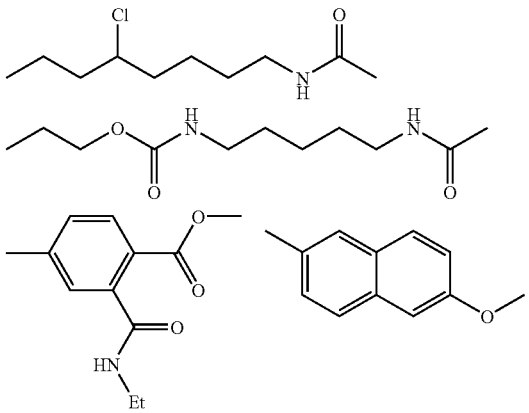

W is preferably a single bond.

$B^2$ is a hydrogen atom, an alkyl group or an aryl group.

The alkyl group represented by $B^2$ may have one or more substituent, or may be an alicyclic compound, or may be branched. The alkyl group preferably has 1 to 30 carbon atoms, and more preferably 1 to 20 carbon atoms. When the alkyl group has at least one substituent, the substituent is preferably an aryl group, an alkenyl group, an alkoxy group, an alkoxycarbonyl group, an aryloxycarbonyl group, an acylamino group or a carbamoyl group. The acyl group may be an aliphatic group or an aromatic group, and the carbamoyl group may have, as a substituent, an alkyl group or an aryl group. The substituent of the alkyl group is more preferably an alkoxy group, an alkoxycarbonyl group, an aryloxycarbonyl group, an acylamino group or a carbamoyl group.

The aryl group represented by $B^2$ may have one or more substituent, and preferably has 6 to 30 carbon atoms, and more preferably 6 to 20 carbon atoms. When the aryl group has at least one substituent, the substituent is preferably an alkyl group, an aryl group, a halogen atom, an alkenyl group, an alkynyl group, an alkoxy group, a cyano group, an alkoxycarbonyl group, an aryloxycarbonyl group, an acylamino group or a carbamoyl group. The acyl group may be an aliphatic group or an aromatic group, and the carbamoyl group may have, as a substituent, an alkyl group or an aryl group. The substituent of the aryl group is more preferably an aryl group, an alkoxy group, a cyano group, an alkoxycarbonyl group, an aryloxycarbonyl group, an acylamino group or a carbamoyl group.

$B^2$ is preferably an alkyl group or an aryl group. Examples of such $B^2$ include a methyl group, an ethyl group, a propyl group, an isopropyl group, a butyl group, a t-butyl group, a cyclohexyl group, an adamantyl group, a phenyl group, a trimethylphenyl group, a naphthyl group and a methylcarbamoylphenyl group.

Specific examples of the compound represented by Formula (II) include (meth)acrylic acid esters such as methyl (meth)acrylate, ethyl (meth)acrylate, propyl (meth)acrylate, isopropyl (meth)acrylate, butyl (meth)acrylate, hexyl (meth)acrylate, cyclohexyl (meth)acrylate, 2-ethylhexyl (meth)acrylate, octyl (meth)acrylate, chloroethyl (meth)acrylate, allyl (meth)acrylate, 2-hydroxyethyl (meth)acrylate, 2-hydroxypropyl (meth)acrylate, benzyl (meth)acrylate, phenoxyethyl (meth)acrylate, phenyl (meth)acrylate, cyanophenyl (meth)acrylate, naphthyl (meth)acrylate, adamantyl (meth)acrylate, ethoxycarbonylphenyl (meth)acrylate and pentachlorophenyl (meth)acrylate; (meth)acrylamides such as (meth)acrylamide, N-alkyl(meth)acrylamide (examples of the alkyl group include a methyl group, an ethyl group, a propyl group, a butyl group, a t-butyl group, an octyl group, an ethylhexyl group, a cyclohexyl group, a hydroxyethyl group and a benzyl group), N-aryl(meth)acrylamide (examples of the aryl group include a phenyl group, a naphthyl group and an ethoxycarbonylphenyl group), N,N-dialkyl (meth)acrylamide (examples of the alkyl group include a methyl group, an ethyl group, a propyl group, a butyl group, a t-butyl group, an octyl group, an ethylhexyl group and a cyclohexyl group), N,N-diaryl(meth)acrylamide (examples of the aryl group include a phenyl group), N-methyl-N-phenyl(meth)acrylamide, pyrrolidyl(meth)acrylamide and morpholylacrylamide; vinyl esters such as vinyl butylate, vinyl acetate, vinyl acetoacetate and vinyl benzoate; styrenes such as styrene, methylstyrene, dimethylstyrene, ethylstyrene, isopropylstyrene, butylstyrene, hexylstyrene, chloromethylstyrene, trifluoromethylstyrene, ethoxymethylstyrene, methoxystyrene, dimethoxystyrene, chlorostyrene, dichlorostyrene and bromostyrene; (meth)acrylic acid; and polyvinyl methyl ether.

The polymerizable compound represented by Formula (II) is preferably such that a homopolymer thereof has a glass transition temperature of not less than 120° C. The polymerizable compound represented by Formula (II) is more preferably such that a homopolymer thereof has a glass transition temperature of not less than 130° C. Specific examples of such a compound include (meth)acrylic acid esters such as naphthyl methacrylate, 1-adamantyl methacrylate, 3,5-dimethyladamantyl methacrylate, 4-cyanophenyl (meth)acrylate, ethoxycarbonylphenyl (meth)acrylate, 4-biphenyl (meth)acrylate, 2-t -butylphenyl (meth)acrylate, and pentachlorophenyl (meth)acrylate; (meth)acrylamides such as (meth)acrylamide, N-alkyl(meth)acrylamide (examples of the alkyl group include a methyl group, an ethyl group, an iso-propyl group, and a t-butyl group), N-aryl (meth)acrylamide (examples of the aryl group include a phenyl group, a naphthyl group and an ethoxycarbonylphenyl group); N,N-diaryl(meth)acrylamide (examples of the aryl group include a phenyl group), N-methyl-N -phenyl (meth)acrylamide, pyrrolidyl(meth)acrylamide and morpholyl(meth)acrylamide; styrenes such as methylstyrene, dimethylstyrene, t-butylstyrene, isopropyloxycarbonylstyrene, chloromethylstyrene, trifluoromethylstyrene, chlorostyrene, dichlorostyrene and iodostyrene; and (meth) acrylic acid.

The polymer made from at least one raw material including the monomer represented by Formula (I) may be a homopolymer made from one monomer, or a copolymer made from at least two monomers.

In order to prepare a copolymer, one or more monomers represented by Formula (I) and/or one or more compounds copolymerizable with the monomer represented by Formula (I) can be used. The mass ratio of the monomer represented by Formula (I) to the compound copolymerizable with the monomer represented by Formula (I) is preferably 100/0 to 10/90, and more preferably 100/0 to 50/50.

In addition, the copolymer is preferably dissolved in a solvent contained in the isocyanate composition. Examples of the solvent include ethyl acetate, butyl acetate, 1,4-dioxane, tetrahydrofuran, chloroform, methylene chloride, acetonitrile, acetone, methyl ethyl ketone and toluene. The solvent is preferably ethyl acetate, tetrahydrofuran, chloroform, acetonitrile or acetone, and more preferably ethyl acetate or tetrahydrofuran.

Examples of the chain transfer agent including active hydrogen used in the invention include thiols and disulfides each having an —OH group (or hydroxyl group), a primary amino group, a secondary amino group or a carboxyl group. The active hydrogen means a hydrogen atom contained in the —OH group, the primary or secondary amino group or the carboxyl group. The number of active hydrogen atoms is preferably one or two, and more preferably one. The chain transfer agent including active hydrogen is preferably a thiol having a hydroxy group, a primary amino group or a secondary amino group, and more preferably a thiol having a hydroxy group. When the chain transfer agent has two or more groups including active hydrogen, the groups may be the same as or different from each other. It is particularly preferable that the chain transfer agent has two or more groups including active hydrogen which groups are the same.

Examples of the chain transfer agent include 2-mercaptoethanol, 1-mercapto-2-propanol, 3-mercapto-1-propanol, 3-mercapto-2-butanol, 3-mercapto-1,2-propanediol, 2,3-dimercapto-1-propanol, 2-aminoethanethiol, 1-amino-2-methyl-2-propanethiol, mercaptoacetic acid, thiobutyric acid, 3-mercaptopropionic acid and mercaptosuccinic acid.

Next, the radical polymerization method that is carried out in the presence of a chain transfer agent including active hydrogen will be explained.

The mol ratio of the chain transfer agent to the radical polymerizable compound(s) is preferably 1/10 to 1/200, and more preferably 1/20 to 1/100. A radical polymerization initiator used in the polymerization is preferably an azo initiator, a peroxide initiator or a redox initiator, and more preferably an azo initiator. Examples of such initiators include azobisisobutyronitrile, methyl azobisisobutyrate, azobiscyclohexanecarbonitrile, 2,2'-azobis(2,4-dimethylvaleronitrile) and 2,2'-azobis{2-methyl-N-(2-hydroxyethyl)propionamide}.

The mol ratio of the radical polymerization initiator to the chain transfer agent is preferably 1/100 to 1/5, and more preferably 1/20 to 1/10. As the reaction solvent in the polymerization, methanol, ethanol, isopropyl alcohol, ethyl acetate, butyl acetate, methyl ethyl ketone, acetonitrile, tetrahydrofuran, dimethylformamide, dimethylacetoamide or chloroform is preferably used. The amount of the reaction solvent to be used is such that the concentration of the polymerizable compound(s) in the solution becomes 10 to 100% by mass, and more preferably 30 to 70% by mass. The temperature of polymerization is preferably 40° C. to 120° C., and more preferably 50° C. to 90° C. Each of the monomer, the chain transfer agent, and the polymerization initiator may be added all at once to the reaction system, or they may be added in separate portions, or they may be added by drip-feed.

Specific examples of the polymer obtained by radically polymerizing in the presence of a chain transfer agent including active hydrogen atom(s) a polymerizable compound including a polyether represented by Formula (I), are shown below.

| | (a) Compound of Formula (I) | (b) Chain Feed Transfer Agent | Ratio by Mass of (a):(b) |
|---|---|---|---|
| 2-1 | acrylate-(O-CH2CH2)98-Me | HO-CH2CH2-SH | 215:1 |
| 2-2 | acrylate-(O-CH2CH2)98-Me | HOCH2-CH(OH)-CH2-SH | 207:1 |
| 2-3 | acrylate-(O-CH2CH2)98-Me | CH3-CH(OH)-CH(SH)-CH3 | 243:1 |
| 2-4 | acrylate-(O-CH2CH2)45-Me | HO-CH2CH2-SH | 307:1 |
| 2-5 | 4-acrylamido-benzoate-(O-CH2CH2)98-Me | HO-CH2CH2-SH | 198:1 |
| 2-6 | methacrylate-(O-CH(CH3)CH2)50-Bu | H2N-CH2CH2-SH | 244:1 |
| 2-7 | acrylate-(O-CH2CH2)98-Me (50/50 mass %) acrylate-(O-CH2CH2)20-Me | HO-CH2CH2-SH | 365:1 |
| 2-8 | acrylate-(O-CH2CH2)98-Me (40/60 mass %) acrylate-(O-CH2CH2)20-Me | CH3-CH(OH)-CH2-SH | 262:1 |
| 2-9 | acrylate-(O-CH2CH2)45-Me (70/30 mass %) methacrylate-O-CH2CH2-O-C(O)-CH2-(O-CH2CH2)98-Me | HO-CH2CH2-SH | 213:1 |
| 2-10 | acrylate-(O-CH2CH2)30-Me (90/10 mass %) | | |

| (a) Compound of Formula (I) | (b) Chain Feed Transfer Agent | Ratio by Mass of (a):(b) |
|---|---|---|
| [acrylamido-phenyl benzoate PEG methyl ether, n=98] | H₂N–CH₂CH₂–SH | 209:1 |
| 2-11 [methacrylate-(O-CH₂CH₂)₉₀-OMe] | HO–CH₂CH₂–SH | 198:1 |
| 2-12 [methacrylate-(O-CH₂CH₂)₉₀-OMe] | HO-CH(OH)-CH₂-CH₂-SH | 190:1 |
| 2-13 [methacrylate-(O-CH₂CH₂)₉₀-OMe] | CH₃-CH(OH)-CH(SH)-CH₃ | 223:1 |
| 2-14 [methacrylate-(O-CH₂CH₂)₉₀-OMe] | HO–CH₂CH₂–SH | 197:1 |

Specific examples of polymers of the invention obtained by radically polymerizing a polymerizable compound including a polyether represented by Formula (I) with a polymerizable compound represented by Formula (II), in the presence of a chain transfer agent including active hydrogen atom(s), are shown below.

| (a) Compound of Formula (I) | (b) Compound of Formula (II) | (c) Chain Transfer Agent | *1 |
|---|---|---|---|
| 2-15 [acrylate-(O-CH₂CH₂)₉₈-OMe] | N-ethyl acrylamide | HO–CH₂CH₂–SH | 179:47:1 |
| 2-16 [acrylate-(O-CH₂CH₂)₉₈-OMe] | N-methyl acrylamide | HO–CH₂CH₂–SH | 168:39:1 |
| 2-17 [acrylate-(O-CH₂CH₂)₉₈-OMe] | N-isopropyl acrylamide | HO–CH₂CH₂–SH | 186:62:1 |
| 2-18 [acrylate-(O-CH₂CH₂)₉₈-OMe] | 1-acryloylpyrrolidine | HO–CH₂CH₂–SH | 227:76:1 |

-continued
| | | | | |
|---|---|---|---|---|
| 2-19 | 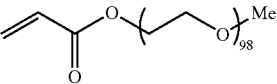 | 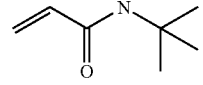 | 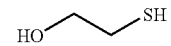 | 156:42:1 |
| 2-20 | 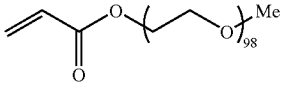 | 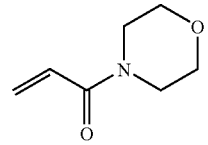 | 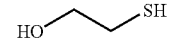 | 305:62:1 |
| 2-21 | 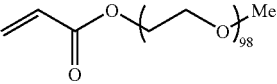 | 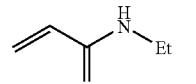 | 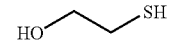 | 221:42:1 |
| 2-22 | 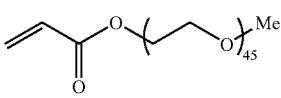 | 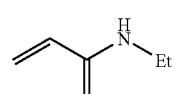 | 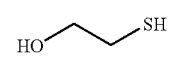 | 183:30:1 |
| 2-23 | 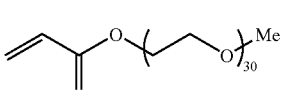 | 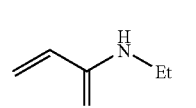 |  | 156:48:1 |
| 2-24 | 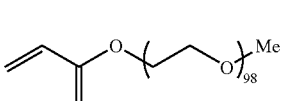 | 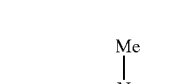 | 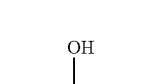 | 151:42:1 |
| 2-25 | 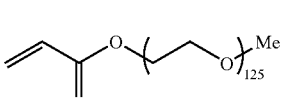 | 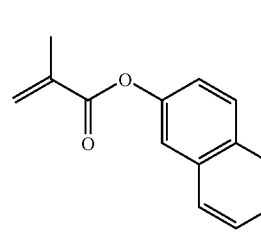 |  | 253:72:1 |
| 2-26 | 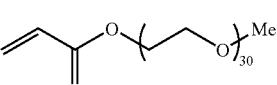 | 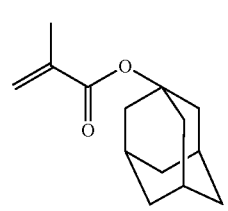 | 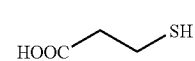 | 189:42:1 |
| 2-27 | 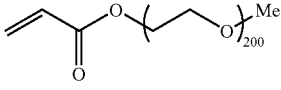 | 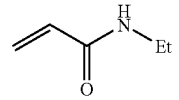 | 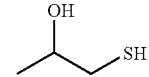 | 205:52:1 |
| 2-28 | 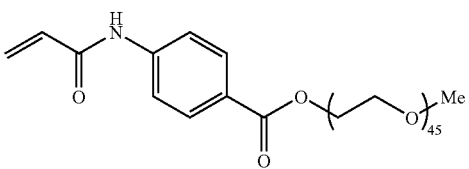 | 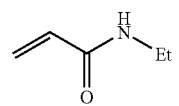 | 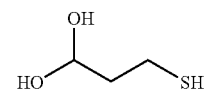 | 178:42:1 |

| | (a) Compound of Formula (I) | (b) Compound of Formula (II) | (c) Chain Transfer Agent | Feed Ratio by Mass of (a):(b):(c) |
|---|---|---|---|---|
| 2-29 | 4-vinylbenzoate-O-(CH$_2$CH$_2$O)$_{120}$-Me | acrylamide N-Et | 3-mercapto-2-butanol (SH, OH) | 256:59:1 |
| 2-30 | acrylate-O-(CH$_2$CH$_2$O)$_{98}$-Me | acrylamide NH$_2$ | HO-CH$_2$CH$_2$-SH | 113:13:1 |
| 2-31 | methacrylate-O-(CH$_2$CH$_2$O)$_{90}$-Me | acrylamide N-Et | HO-CH$_2$CH$_2$-SH | 77:20:1 |
| 2-32 | methacrylate-O-(CH$_2$CH$_2$O)$_{90}$-Me | acrylamide N-Me | HO-CH$_2$CH$_2$-SH | 159:39:1 |
| 2-33 | methacrylate-O-(CH$_2$CH$_2$O)$_{90}$-Me | acrylamide NH$_2$ | HO-CH$_2$CH$_2$-SH | 46:2.4:1 |
| 2-34 | acrylate-O-(CH$_2$CH$_2$O)$_{45}$-Me | acrylamide N-Et | HO-CH$_2$CH$_2$-SH | 125:38:1 |
| 2-35 | acrylate-O-(CH$_2$CH$_2$O)$_{45}$-Me | acrylamide NH$_2$ | HO-CH$_2$CH$_2$-SH | 105:12:1 |

*1 Feed Ratio by Mass of (a):(b):(c)

Specific examples of polymers obtained by radically polymerizing a polymerizable compound including a polyether represented by Formula (I) and two polymerizable compounds represented by Formula (II) in the presence of a chain transfer agent including active hydrogen atom(s), are shown below.

| | (a) Compound of Formula (I) | (b) Compound A of Formula (II) | (c) Compound B of Formula (II) | (d) Chain Transfer Agent | Feed Ratio by mass of (a):(b):(c):(d) |
|---|---|---|---|---|---|
| 3-1 | acrylate-O-(CH$_2$CH$_2$O)$_{98}$-Me | acrylamide N-Et | acrylamide NH$_2$ | HO-CH$_2$CH$_2$-SH | 113:10:3:1 |
| 3-2 | acrylate-O-(CH$_2$CH$_2$O)$_{98}$-Me | acrylamide N-Et | acrylamide N-Me | HO-CH$_2$CH$_2$-SH | 77:10:10:1 |
| 3-3 | acrylate-O-(CH$_2$CH$_2$O)$_{98}$-Me | acrylamide N-Me | acrylamide NH$_2$ | HO-CH$_2$CH$_2$-SH | 159:29:10:1 |

-continued

| (a) Compound of Formula (I) | (b) Compound A of Formula (II) | (c) Compound B of Formula (II) | (d) Chain Transfer Agent | Feed Ratio by mass of (a):(b):(c):(d) |
|---|---|---|---|---|
| 3-4 ![acrylate-PEG-Me, n=98] | ![acrylamide-Et] | ![acrylamide-CH(Me)] | HO-CH2CH2-SH | 46:1.6:0.8:1 |
| 3-5 ![acrylate-PEG-Me, n=98] | ![acrylamide-Et] | ![acrylamide-Me] | HO-CH2CH2-SH | 125:20:18:1 |
| 3-6 ![acrylate-PEG-Me, n=45] | ![acrylamide-Et] | ![acrylamide-NH2] | HO-CH2CH2-SH | 105:10:2:1 |

The isocyanate composition of the invention is an isocyanate composition obtained by radically polymerizing, in the presence of a chain transfer agent including active hydrogen, at least: an adduct of a multifunctional isocyanate compound (B) having two or more isocyanate groups in the molecule thereof; and a polymer (A) a vinyl monomer including a polymerizable compound having a polyether represented by Formula (I)

The isocyanate composition preferably includes a reaction product to which the adduct of a multifunctional isocyanate compound having two or more isocyanate groups in the molecule thereof and a polymer obtained by radically polymerizing at least a vinyl monomer including a polymerizable compound having a polyether represented by Formula (I) in the presence of a chain transfer agent including active hydrogen bonds via a urethane group, a urea group or an amide group.

Next, the multifunctional isocyanate compound (B) having two or more isocyanate groups in the molecule thereof will be explained in detail.

The multifunctional isocyanate compound is, for example, a compound having two isocyanate groups in the molecule thereof. Examples of such a compound include m-phenylenediisocyanate, p-phenylenediisocyanate, 2,6-tolylenediisocyanate, 2,4-tolylenediisocyanate, naphthalene-1,4-diisocyanate, diphenylmethane-4,4'-diisocyanate, 3,3'-dimethoxy-biphenyldiisocyanate, 3,3'-dimethyldiphenylmethane-4,4'-diisocyanate, p-xylylenediisocyanate, m-xylylenediisocyanate, 4-chloroxylylene-1,3-diisocyanate, 2-methylxylylene-1,3-diisocyanate, 4,4'-diphenylpropanediisocyanate, 4,4'-diphenylhexafluoropropanediisocyanate, trimethylenediisocyanate, hexamethylenediisocyanate, propylene-1,2-diisocyanate, butylene-1,2-diisocyanate, cyclohexylene-1,2-diisocyanate, cyclohexylene-1,3-diisocyanate, cyclohexylene-1,4-diisocyanate, dicyclohexylmethane-4,4'-diisocyanate, 1,4-bis(isocyanatemethyl)cyclohexane, 1,3-bis(isocyanatemethyl)cyclohexane, isophoronediisocyanate, lysinediisocyanate and norbornenediisocyanate. In addition, adducts of any of these bifunctional isocyanate compounds and a bifunctional alcohol such as ethylene glycols and bisphenol, or bifunctional phenol can also be used as such a compound.

Further, tri- or above multifunctional isocyanate compounds can be used as the multifunctional isocyanate.

Examples of such a compound include: trimers (biurets or isocyanurates) of the above-described bifunctional isocyanate compounds; multifunctional adducts of a polyol such as trimethylolpropane, glycerine, and pentaerythritol with a bifunctional isocyanate compound; formalin condensates of benzeneisocyanate; polymers of an isocyanate compound having a polymerizable group such as methacryloyloxyethyl isocyanate; and lysine triisocyanate type compounds.

The multifunctional isocyanate compound having two or more isocyanate groups in the molecule is preferably a trimer (biuret or isocyanurate) of: xylylenediisocyanate, tolylenediisocyanate, xylenediisocyanate (or hydrogenated compounds thereof); or hexamethylenediisocyanate, tolylenediisocyanate (or hydrogenated compounds thereof). Alternatively, other preferable compounds are multifunctional adducts of any of the above compounds with trimethylolpropane. These compounds are explained in detail in "Polyurethane Resin Handbook" edited by Keiji Iwata, and published by The Nikkan Kogyo Shimbun, Ltd. in 1987.

The multifunctional isocyanate compound having two or more isocyanate groups in the molecule is more preferably: 2,4-tolylenediisocyanate; 2,6-tolylenediisocyanate; xylylene-1,4-diisocyanate; xylylene-1,3-diisocyanate; or adducts of trimethylolpropane with xylylene-1,4-diisocyanate or xylylene-1,3-diisocyanate. Still more preferably it is: xylylene-1,4-diisocyanate or xylylene-1,3-diisocyanate; or an adduct of trimethylolpropane with xylylene-1,4-diisocyanate or xylylene-1,3-diisocyanate.

In the invention, the reaction ratio (mol ratio) of the (co)polymer (A) having active hydrogen and the isocyanate group (B) is preferably 1/100 to 50/100, and more preferably 2/100 to 40/100. When the reaction ratio is less than 1/100, effect of improving sensitivity may become insufficient. When the reaction ratio is more than 50/100, the amount of isocyanate group decreases, which may make it difficult to form capsules.

The addition reaction of the copolymer (A) having active hydrogen and the isocyanate group (B) can be readily conducted by, for example, reacting these compounds, which are being stirred in an organic solvent free from active hydrogen, at room temperature or a raised temperature (about 20 to 80° C.), or reacting them, which are being stirred, at low temperature (about 10 to 60° C.) in the presence of a catalyst such as stannous octylate, or dibutyltin diacetate. Examples of the organic solvent include ethyl acetate, chloroform, tetrahydrofuran, methyl ethyl ketone, acetone, acetonitrile and toluene. The isocyanate composition of the invention may include a single compound formed from an adduct of the compound (A) and the isocyanate (B), or it may be a blend containing two or more of such compounds.

Known multifunctional isocyanate having two or more isocyanate groups can be used together with the isocyanate composition including an adduct of the compound (A) and the isocyanate (B) as one of raw materials of microcapsule wall. Examples of such known multifunctional isocyanate include the compounds shown above as examples of multifunctional isocyanate. The known isocyanate can be used in a suitable amount.

One or more of the known multifunctional isocyanate compounds can be used. In this case, the mass ratio of the adduct of the compound (A) and the isocyanate (B), and the known multifunctional isocyanate is preferably 100/0 to 10/90, and more preferably 100/0 to 20/80.

Microcapsules

The microcapsules of the invention have polyurethane and/or polyurea walls including, via a covalent bond, a polymer obtained by radically polymerizing at least a vinyl monomer including a polymerizable compound having a polyether represented by Formula (I) in the presence of a chain transfer agent including active hydrogen. The polyurethane and/or polyurea walls means polyurethan walls, polyurea walls, or a mixed walls of polyurethane and polyurea.

The microcapsules of the invention are preferably those having polyurethane and/or polyurea walls, whose raw materials include the above-described isocyanate composition of the invention.

The isocyanate composition can be suitably used as one of raw materials (capsule wall material) of the microcapsules of the invention. A known compound having at least two isocyanate groups in the molecule thereof can also be used in combination with the isocyanate composition of the invention in preparation of the microcapsules of the invention. The known compound can be suitably selected from the above-mentioned multifunctional isocyanate compounds. One or more isocyanate compositions of the invention can be used to prepare the microcapsules of the invention. Moreover, one or more other known multifunctional isocyanate compounds may be used together with the isosyanate composition(s).

The mass ratio of the isocyanate composition of the invention and any other known multifunctional isocyanate compound in production of the microcapsules of the invention is preferably 100/0 to 5/95, and more preferably 50/50 to 5/95.

The microcapsules of the invention are preferably produced by a reaction of isocyanate including the isocyanate composition of the invention and a compound having two or more active hydrogen atoms in the molecule thereof. Specific examples of the compound having two or more active hydrogen atoms include water; polyhydric alcohol compounds such as ethylene glycol and glycerine; polyvalent amine compounds such as ethylenediamine and diethylenetriamine; and mixtures thereof. The compound is preferably water. As a result of the above reaction, microcapsules having polyurethane and/or polyurea walls can be obtained.

The polymerization can be readily carried out by reacting these compounds at a temperature within a range of preferably 10 to 70° C., more preferably 20 to 50° C. for preferably 30 minutes to 10 hours, more preferably one hour to 5 hours.

As other components necessary for the production of the microcapsules, such as a substance to be encapsulated, a hydrophobic solvent, and an aqueous phase medium, those known or used in the present state of the art can be used. Examples of the substance that can be encapsulated include fragrance oil, vegetable protective agents, reactive adhesives, diazo compounds, electron-donating dye precursors and medicaments.

When the microcapsules of the invention are contained in thermosensitive recording materials, the microcapsules preferably contain a diazo compound or an electron-donating dye precursor. When the diazo compound or the electron-donating dye precursor is contained in the microcapsules, it is preferable to dissolve the diazo compound or the electron-donating dye precursor in an organic solvent having a high boiling point, and, if necessary, an organic solvent having a low boiling point, and to encapsulate the resultant solution in microcapsules.

Recording Material

The recording material of the invention has a recording layer including microcapsules of the invention, and is preferably a thermosensitive recording material, and more preferably a thermosensitive recording material having a substrate, and a thermosensitive recording layer which includes a coupler and microcapsules encapsulating a diazo compound, or a developer and microcapsules encapsulating an electron-donating dye precursor, wherein the microcapsules includes the microcapsules of the invention.

Furthermore, the multicolor thermosensitive recording material of the invention has a substrate, and a cyan color-forming thermosensitive recording layer, a magenta color-forming thermosensitive recording layer and a yellow color-forming thermosensitive recording layer, and each of these thermosensitive recording layers includes a coupler and microcapsules encapsulating a diazo compound, or a developer and microcapsules encapsulating an electron-donating dye precursor, and the microcapsules includes the microcapsules of the invention.

In the invention, when the substrate is transparent, a black thermosensitive recording layer may be provided on a surface of the substrate which surface is opposite to the substrate surface on which the thermosensitive recording layer is disposed.

Examples of the electron-donating dye precursor contained in the microcapsules of the invention include a triarylmethane compound, a diphenylmethane compound, a thiazine compound, a xanthene compound, and a spiropyrane compound. In particular, triarylmethane compound and a xanthene compound are useful because such compounds give high color density.

Specific examples of the electron-donating dye precursor include 3,3-bis(p-dimethylphenyl)-6-dimethylaminophthalide (namely, crystal violet lactone), 3,3-bid(p-dimethylamino)phthalide, 3-(p-dimethylaminophenyl)-3-(1,3-dimethylindole-3-yl)phthalid, 3-(p-dimethylaminophenyl)-3-(2-methylindole-3-yl)phthalide, 3-(o-methyl-p-dimethylaminophenyl)-3-(2-methylindole-3-yl)phthalide, 3-(o-methyl-p-diethylaminophenyl)-3-(1'-ethyl-2-methylindole-3-yl)phthalide, 4,4-bis(dimethylamino)benzhydrinbenzyl ether, N-halophenylleucoauramine, N-2,4,5,-trichlorophenylleucoauramine, rhodamine-B-anilinolactam, rhodamine(p-nitroanilino)lactam, rhodamine-B-(p-chloroanilino)lactam, 2-benzylamino-6-diethylaminofluoran, 2-anilino-6-diethylaminofluoran, 2-anilino-3-methyl-6-diethylaminofluoran, 2-anilino-3-methyl-6-cyclohexylmethylaminofluoran, 2-anilino-3-methyl-6-isoamylethylaminofluoran, 2-(o-chloroanilino)-6-diethylaminofluoran, 2-octylamino-6-diethylaminofluoran, 2-ethoxyethylamino-3-chloro-2-diethylaminofluoran, 2-anilino-3-chloro-6-diethylaminofluoran, benzoylleucomethyleneblue, p-nirobenzylleucomethyleneblue, 3-methyl -spiro-dinaphthopyran, 3-ethyl-spiro-dinaphthopyran, 3,3'-dichloro -spiro-dinaphthopyran, 3-benzyl-spiro-dinaphtopyran, and 3-propyl -spiro-dibenzopyran.

One of these electron-donating dye precursors may be used, or two or more of them may be used together.

Examples of an electron-accepting compound (a developer, which is not contained in the microcapsules) used in combination with the electron-donating dye precursor include a phenol derivative, a salicylic acid derivative, and a hydroxybenzoic acid ester. The developer is preferably bisphenol or a derivative thereof, or a hydroxybenzoic acid ester.

Specific examples thereof include 2,2-bis(p-hydroxyphenyl) propane (bisphenolA), 2,2-bis(p-hydroxyphenyl)pentane, 2,2-bis(p -hydroxyphenyl)ethane, 2,2-bis(p-hydroxyphenyl)butane, 2,2-bis(4'-hydroxy-3,5',-dichlorophenyl) propane, 1,1-(p -hydroxyphenyl)cyclohexane, 1,1-(p-hydroxyphenyl)propane, 1,1-(p -hydroxyphenyl)pentane, 1,1-(p-hydroxyphenyl)-2-ethylhexane, 3,5-di(α-methylbenzyl)salicylic acid and a polyvalent metal salt thereof, 3,5-di (tert-butyl)salicylic acid and a polyvalent metal salt thereof, 3-α,α-dimethylbenzylsalicylic acid and a polyvalent metal salt thereof, butyl p -hydroxybenzoate, benzyl p-hydroxybenzoate, 2-ethylhexyl p -hydroxybenzoate, p-phenylphenol, and p-cumylphenol.

One of these electron-accepting compounds may be used, or two or more of them may be used together.

The thermosensitive layer preferably contains a sensitizer in order to accelerate reaction. The sensitizer is preferably an organic compound having a low melting point, and appropriately having at least one aromatic group and at least one polar group in the molecule thereof. Specific examples thereof include benzyl p-benzyloxybenzoate, α-naphthyl benzyl ether, β-naphthyl benzyl ether, phenyl β-naphthoate, phenyl α-hydroxy-β-naphtoate, β-naphthol-(p-clorobenzyl) ether, 1,4-butanediol phenyl ether, 1,4-butanediol-p-methylphenyl ether, 1,4-butanediol-p-ethylphenyl ether, 1,4-butanediol-m-methylphenyl ether, 1-phenoxy-2-(p-tolyloxy) ethane, 1-phenoxy-2-(p-ethylphenoxy)ethane, 1-phenoxy-2- (p-chlorophenoxy)ethane, p-benzylbiphenyl, p -toluenesulfonamide, 4-(2-ethylhexyloxy)phenylsulfonamide, and 4-n -pentyloxyphenylsulfonamide.

One of these sensitizers may be used, or two or more of them may be used together.

The diazo compound to be encapsulated in the microcapsules of the invention can be a known diazo compound. The diazo compound is represented by the following formula:

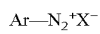

In the formula, Ar is an aryl group and X⁻ is an acid anion.

The diazo compound can react with a phenol compound or a compound having active methylene to form a so-called dye. When irradiated with light (generally ultraviolet), the diazo compound decomposes, and loses its reactivity due to denitrogenation.

Specific examples of the diazo compound includes salts of 2,5-dibutoxy-4-morpholinobenzenediazonium, 2,5-octoxy-4-morpholinobenzenediazonium, 2,5-dibutoxy-4 (N-(2-ethylhexanoyl)piperazino)benzenediazonium, 2,5-diethoxy-4- (N-(2-(2,4-di-tert-amylphenoxy)butylyl)piperazino) benzenedia, 2,5-dibutoxy-4-tolylthiobenzenediazonium, 2,5-dibutoxy-4-chlorobenzenethiodiazonium, 2,5-diheptyloxy-4-chlorobenzenethiodiazonium, 3-(2-octyloxyethoxy)-4-morpholinobenzenediazonium, 4-N,N-dihexylamino-2-hexyloxybenzenediazonium, 4-(N-hexyl-N-(1-methyl-2-(p -methoxyphenoxy)ethyl)amino)-2-hexyl oxybenzenediazonium and 4-N -hexyl-N-tolylamino-2-hexyloxybenzenediazonium.

The acid anion in the diazo compound can be a hexafluorophosphate salt, a tetrafluoroborate salt, a 1,5-naphthalenesulfonate salt, a perfluoroalkylcarbonate salt, a perfluoroalkylsulfonate salt, a zinc chloride salt or a tin chloride salt. The acid anion is preferably a hexafluorophosphate salt, a tetrafluoroborate salt or a 1,5-naphthalenesulfonate salt, since it has low solubility in water and can be dissolved in an organic solvent.

One of these diazo compounds may be used, or two or more of them can be used together.

The thermosensitive recording layer including microcapsules encapsulating a diazo compound may also include a known heat sensitizer such as an arylsulfonamide compound. Specific examples thereof include toluene sulfonamide and ethyl benzenesulfonamide. One heat sensitizer may be used, or two or more heat sensitizers can be used together.

The coupler that reacts with the diazo compound to form a dye is used in the form of microparticles by emulsification-dispersing and/or solid dispersing.

Specific examples of the coupler include resorcin, phloroglucin, sodium 2,3-dihydroxynaphthalene-6-sulfonate, 1-hydroxy-2-naphthoic acid morpholinopropylamide, 1,5-dihydroxynaphthalene, 2,3-dihydroxynaphthalene, 2,3-dihydroxy-6-sulfanylnaphthalene, 2-hydroxy-3-naphthoic acid anilide, 2-hydroxy-3-naphthoic acid ethanolamide, 2-hydroxy-3-naphthoic acid octylamide, 2-hydroxy-3-naphthoic acid-N-dodecyloxypropylamide, 2-hydroxy-3-naphthoic acid tetradecylamide, acetoanilide, acetoacetoanilide, benzoylacetoanilide, 2-chloro-5-octylacetoacetoanilide, 2,5-di-n-heptyloxyacetoanilide, 1-phenyl-3-methyl-5-pyrazolone, 1-(2'-octylphenyl)-3-methyl-5-pyrazolone, 1-(2',4', 6'-trichlorophenyl)-3-benzamide-5-pyrazolone, 1-(2',4',6'-trichlorophenyl)-3-anilino-5-pyrazolone, 1-phenyl-3-phenylacetoamide -5-pyrazolone, 1-(2-dodecyloxyphenyl)-2-methylcarbonatecyclohexane -3,5-dione, 1-(2-dodecyloxyphenyl)cyclohexane-3,5-dione, N-phenyl-N -dodecylbarbituric acid, N-phenyl-N-(2,5-dioctyloxyphenyl)barbituric acid and N-phenyl-N-(3-stearyloxy)butylbarbituric acid.

One of these couplers may be used, or two or more of them may be used together to obtain a desired hue.

In order to accelerate a dye-forming reaction, the thermosensitive layer generally contains a basic compound in the shape of fine particles obtained by emulsification-dispersing and/or solid dispersing. The basic compound can be an inorganic basic compound, an organic basic compound, or a compound which, when heated, decomposes to release an alkali material. Typical examples thereof include organic ammonium salts; organic amines; amide; urea, thiourea and derivatives thereof; and nitrogen-containing compounds such as thiazoles, pyrroles, pyrimidines, piperazines, guanidines, indoles; imidazoles; imidazolines, triazoles, morphorines, piperidines, amidines, formazines, and pyridines.

Specific examples thereof include tricyclohexylamine, tribenzylamine, octadecylbenzylamine, stearylamine, allylurea, thiourea, methylthiourea, allylthiourea, ethylenethiourea, 2-benzylimidazole, 4-phenylimidazole, 2-phenyl-4-methylimidazole, 2-undecylimidazoline, 2,4,5-trifuril-2-imidazoline, 1,2-diphenyl-4,4-dimethyl-2-imidazoline, 2-phenyl-2-imidazoline, 1,2,3-triphenylguanidine, 1,2-dicyclohexylguanidine, 1,2,3-tricyclohexylguanidine, guanidine trichloroacetate, N,N'-dibenzylpyperazine, 4,4'-dithiomorpholine, morpholinium trichloroacetate salt, 2-aminobenzothiazole, and 2-benzoylhydrazinobenzothiazole.

One of these basic compounds may be used, or two or more of them can be used together.

Specific steps of the production of the microcapsules encapsulating a diazo compound or an electron-donating dye precursor of the invention are as follows.

A hydrophobic solvent can be used to form cores of the microcapsules, and is preferably an organic solvent having a boiling point of 100 to 300° C. Specific examples thereof include alkylnaphthalene, alkyldiphenylethane, alkyldiphenylmethane, adducts in which an alkyl compound is added to diphenylethane, alkylbiphenyl, chlorinated paraffin, phosphoric acid derivatives such as tricresyl phosphate, maleic acid esters such as di-2-ethylhexyl maleate, and adipic acid esters. Two or more of these solvents may be used as a mixture. When the solubility of the diazonium salt compound or the electron-donating dye precursor in the hydrophobic solvent is insufficiently high, a solvent having a low boiling point solvent can be used in combination with the above solvent. The solvent having a low boiling point is preferably an organic solvent having a boiling point of 40 to 100° C., and specific examples thereof include ethyl acetate, butyl acetate, methylene chloride, tetrahydrofuran and acetone. Two or more of these solvents may be used as a mixture. When the solvent(s) to be contained in the cores of the microcapsules is only a solvent having a low boiling point (boiling point of not more than about 100° C.), the solvent evaporates during production of microcapsules and capsules including merely capsule walls and a diazonium salt compound or an electron-donating dye precursor, so-called coreless capsules, may be produced easily.

Some kind of a diazo compound may move from an oil phase to an aqueous phase during encapsulation reaction. In order to prevent such a phenomenon, an acid anion may be added in advance to the solution of a water-soluble polymer used in production of microcapsules. Examples of the acid anion include $PF_6^-$, B $(—Ph)_4^-$, $ZnCl_2^-$, $C_nH_{2n+1}$, $COO^-$, and $C_pF_{2p+1}SO_3^-$. Here, Ph is a phenyl group, and each of n and p is an integer of 1 to 9.

In addition, various additives can be used in the production so as to adjust storage stability and color development sensitivity.

When microcapsules are formed in the invention, water is generally used as a compound having active hydrogen used in polymerization of the isocyanate compound to form walls of the microcapsules. However, polyol may be added, as a compound having active hydrogen (one of raw materials of the microcapsule walls), to an organic solvent to be contained in the cores of the microcapsules, or to a water-soluble polymer solution serving as a dispersion medium. Specific examples of the polyol include propylene glycol, glycerin, and trimethylolpropane. An amine compound such as diethylenetriamine or tetraethylenepentamine can be used instead of the polyol, or can be used together with the polyol. These compounds are also described in "Polyurethane Resin Hand Book" mentioned above.

Examples of the water-soluble polymer to disperse, in an aqueous phase, an oil phase used in production of microcapsules include polyvinyl alcohol and a modified compound thereof; polyacrylic acid amide and a derivative thereof; an ethylene/vinyl acetate copolymer; a styrene/maleic anhydride copolymer; an ethylene/maleic anhydride copolymer; an isobutylene/maleic anhydride copolymer; polyvinyl pyrrolidone; an ethylene/acrylic acid copolymer; a vinyl acetate/acrylic acid copolymer; carboxymethylcellulose; methylcellulose; casein; gelatin; a starch derivative, gum arabic; and sodium alginate. It is preferable that the water-soluble polymer does not react with or hardly reacts with the isocyanate compound. Thus, if a compound having a reactive amino group in the molecular chain thereof such as gelatin, is used as the water-soluble polymer, it is necessary to deactivate the compound in advance.

In the invention, a surfactant, when used, may be added to an oil phase or an aqueous phase. However, since the surfactant has lower solubility in an organic solvent, it is preferable to add the surfactant to the aqueous phase. The amount of the surfactant to be added is preferably in the range of 0.1 to 5% by mass, and more preferably in the range of 0.5 to 2% by mass with respect to the mass of the oil phase. It is thought that a surfactant having a relatively long-chain hydrophobic group is excellent as a surfactant generally used in emulsification-dispersing (see Ichiro Nishi et al. (Ed.), Surfactant Hand Book, Sangyotosho, 1980). Examples of such a surfactant include alkali metal salts of alkylsulfonic acid and alkylbenzenesulfonic acid.

In the invention, compounds such as a condensate of formalin and an aromatic sulfonate and a condensate of formalin and an aromatic carboxylate, represented by the following Formula (A), can also be used as the surfactant (an emulsion auxiliary).

Formula (A)

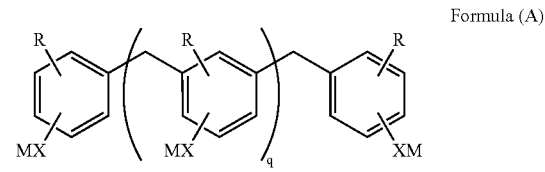

In Formula (A), R represents an alkyl group having 1 to 4 carbon atoms, X represents $SO_3^-$ or $COO^-$, M represents a sodium atom or a potassium atom, and q represents an integer of 1 to 20. Compounds represented by Formula (A) are described in JP-A No. 6-297856.

An alkoxyglucoside compound represented by the following Formula (B) can also be used as the surfactant.

Formula (B)

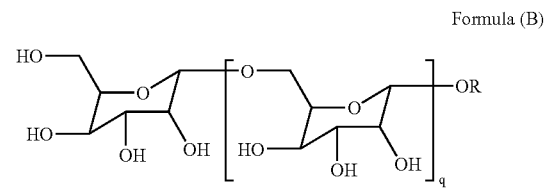

In Formula (B), R represents an alkyl group having 4 to 18 carbon atoms and q represents an integer of 0 to 2.

In the invention, one of the above-described surfactants may be used, or two or more of them can be used together. These surfactants are disclosed in JP-A Nos. 6-297856 and 7-116501, and usage thereof is also described in these publications.

A mixed liquid (oil phase) which includes a solution containing the diazo compound (or electron-donating dye precursor) and a solvent having a high boiling point, and which includes the isocyanate composition of the invention is added to an aqueous solution (aqueous phase) including the surfactant and the water-soluble polymer. At this time, the oil phase is added to the aqueous solution which is being stirred with a high-shear agitator such as a homogenizer to carry out emulsification-dispersing. After this emulsification-dispersing, a reaction for forming capsule walls is carried out by adding a polymerization catalyst for the isocyanate compound to the resultant emulsion-dispersion, or raising the temperature of the emulsion-dispersion.

A coupling reaction-deactivating agent can further be added to thus prepared microcapsule liquid with microcapsules encalsupating the diazo compound. Examples of the deactivating agent include hydroquinone, sodium bisulfite, potassium nitrite, hypophosphorous acid, stannous chloride, and formalin. These compounds are described in JP-A No. 60-214992.

The diazo compound often migrates to and is dissolved in the aqueous phase during formation of capsules. In order to remove the dissolved diazo compound, methods, such as filtration, ionic exchange, electrophoreisis, chromatographic treatment, gel filteration, reverse osmosis, ultrafiltration, dialysis, and/or active charcoal treatment, can be employed. Among them, ionic exchange, reverse osmosis, ultrafiltration, and/or dialysis, are preferably conducted. Treatment utilizing a cation exchanger, or treatment utilizing both a cation exchanger and an anion exchanger, is particularly preferably used. These methods are described in JP-A No. 61-219688.

In the invention, the thermosensitive recording layer may contain any of an electron-accepting compound, a heat sensitizer, a coupler, and a basic compound. These compounds can each be mixed with an appropriate solvent and the resultant mixtures separately emulsification-dispersed. Alternatively, solid-dispersions can be made of fine particles of each before they are added to a system. Alternatively, these compounds can be appropriately mixed together first, and the resultant mixture can be emulsification-dispersed, or a solid-dispersion can be made of fine particles of the mixture before adding to a system. For emulsification-dispersing, these compounds are dissolved in an organic solvent, and the resultant solution is added to an aqueous water-soluble polymer solution which is being stirred with, for example, a homogenizer. In order to promote fine particle formation, any of the aforementioned hydrophobic organic solvents, any of the above-described surfactants and/or any of the aforementioned water-soluble polymers are preferably added to the system.

The coupler, the basic compound, the electron-accepting compound and the heat sensitizer can be solid-dispersed by adding powder of each of these materials to an aqueous solution of the water-soluble polymer, followed by formation of microparticles with a known dispersion means such as a ball mill. The formation of microparticles is preferably carried out in order that the resultant particles have a diameter that can satisfy properties required for a thermosensitive recording material and a production method thereof, such as thermal sensitivity, storability, transparency of the recording layer and production suitability.

The above-described microcapsule liquid is mixed in a suitable ratio with the preparation liquid, including a heat sensitizer, an electron-accepting compound, a coupler and a basic compound, and the resultant liquid is applied onto a substrate. The amount of the coupler is generally 1 to 10 mol, and preferably 2 to 6 mol relative to 1 mol of the diazo compound. The optimal amount of the basic compound depends on the level of basicity of the compound, but is generally 0.5 to 5 mol relative to 1 mol of the diazo compound.

The amount of the electron-accepting compound (developer) is generally 0.5 to 30 mol, preferably 1 to 20 mol, and more preferably 3 to 15 mol relative to 1 mol of the electron-donating dye precursor. The amount of the heat sensitizer is generally 0.1 to 20 mol, and preferably 0.5 to 10 mol relative to 1 mol of the electron-donating dye precursor.

The substrate to which the coating solution(s) is applied can be a substrate known as that for heat-sensitive recording materials. Examples thereof include paper, coated paper obtained by coating paper with clay, laminate paper obtained by laminating polyethylene, or polyester on paper, synthetic paper, and films made of plastics such as polyethylene terephthalate, polyimide, and triacetylcellulose. Further, as the transparent substrate, the above-described polyethylene terephthalate, triacetyl cellulose, and, plastic films such as polystyrene, polypropylene, and polyethylene are exemplified.

In the invention, a protective layer may be provided on the thermosensitive recording layer to improve light-fastness of the recording material. Further, in the multicolor heat-sensitive material, an intermediate layer may be disposed between the thermosensitive recording layers to improve color reproduction. The material of each of these layers is preferably an emulsion (latex) of a water-soluble polymer compound or a hydrophobic polymer compound.

Description of a multicolor thermosensitive recording material and a recording method thereof of the invention will be given. First of all, the outermost thermosensitive layer (a first heat-sensitive layer, which is usually a yellow color-forming layer) including a diazo compound is developed by thermal recording at a low energy. Thereafter, the entire surface of the outermost thermosensitive layer is illuminated with light emitted from a light source which light can be absorbed by the diazo compound in the outermost thermosensitive layer to optically decompose the diazo compound remaining in the outermost thermosensitive layer.

Then, a second thermosensitive recording layer (which is usually a magenta color-forming layer) including another diazo compound which has a light absorption wavelength range different from that of the diazo compound included in the first layer, is developed at energy higher than that when the first thermosensitive recording layer is developed. Thereafter, the entire surface of the recording material is illuminated with another light emitted from a light source which light is absorbed by the diazo compound in the second thermosensitive recording layer to optically decompose the diazo compound remaining in the second thermosensitive recording layer. Finally, the innermost layer (a third thermosensitive recording layer, which is usually a cyan color-forming layer) including an electron-donating dye precursor is developed at energy higher than that when the second thermosensitive recording layer is developed, to complete image recording.

In the above case, the outermost and second layers are preferably transparent, since color development in each layer becomes vivid. In the invention, a multicolor image can also be obtained by employing a transparent support and providing two of the three layers described above on one surface of the transparent support and the other on another surface of the support. In this case, it is unnecessary that the outermost thermosensitive layer on the side of the support opposite to the viewer's side be transparent.

The light source used in the photodecomposition of each of the diazo compounds is usually an ultraviolet lamp. The ultraviolet lamp is a fluorescent tube including therein mercury vapor. Fluorescent tubes having various kinds of light emitting wavelengths can be obtained by using different kinds of phosphors which are applied to the inner walls of the tubes.

The multicolor heat-sensitive recording material may have a third thermosensitive recording layer including a proper combination of a diazo compound and a coupler compound.

EXAMPLES

Hereinafter, the invention will be specifically explained with referring to Examples, but the invention is not limited to these Examples. All the "parts" and "%" in Examples mean "parts by mass" and "% by mass", respectively, unless otherwise indicated.

Synthetic Example 1

18.8 parts of exemplified compound 1-1, compound represented by Formula (I), was dissolved in 18 parts of ethyl acetate. 0.105 parts of 2-mercaptoethanol was added to the resultant solution. Polymerization was carried out in the presence of 0.04 parts of 2,2'-azobis(2,4-dimethylvaleronitrile) (V-65™ manufactured by Wako Pure Chemical Industries, Ltd.,), serving as a polymerization initiator, in a surrounding temperature of 70° C. for 7 hours under nitrogen flow. After the completion of the polymerization, the resultant polymer solution was added to 300 parts of hexane to precipitate a product. As a result, 17.5 parts of exemplified polymer 2-1 was produced by radical polymerization of the above-mentioned compound 1-1 (yield: 93%).

Synthetic Example 2

18.8 parts of exemplified compound 1-1, compound represented by Formula (I), and 5 parts of N-ethylacrylamide were dissolved in 20 parts of ethyl acetate. 0.105 parts of 2-mercaptoethanol was added to the resultant solution. Polymerization was carried out in the presence of 0.04 parts of 2,2'-azobis(2,4-dimethylvaleronitrile) (V-65™ manufactured by Wako Pure Chemical Industries, Ltd.,) serving as a polymerization initiator at a surrounding temperature of 70° C. for 7 hours under nitrogen flow. After the completion of the polymerization, the resultant polymer solution was added to 300 parts of hexane to precipitate a product. As a result, 22.3 parts of exemplified polymer 2-15 was produced by radical polymerization of the above-mentioned compound 1-1 and N -ethylacrylamide (yield: 94%).

Synthetic Example 3

17.2 parts of exemplified compound 1-1, compound represented by Formula (I), and 4 parts of N-ethylacrylamide were dissolved in 20 parts of ethyl acetate. 0.102 parts of 2-mercaptoethanol was added to the resultant solution. Polymerization was carried out in the presence of 0.035 parts of 2,2'-azobis(2,4-dimethylvaleronitrile) (V-65™ manufactured by Wako Pure Chemical Industries, Ltd.,) serving as a polymerization initiator at a surrounding temperature of 70° C. for 7 hours under nitrogen flow. After the completion of the polymerization, the resultant polymer solution was added to 300 parts of hexane to precipitate a product. As a result, 20.1 parts of exemplified polymer 2-16 was produced by radical polymerization of the above-mentioned compound 1-1 and N-ethylacrylamide (yield: 95%).

Synthetic Example 4

24.0 parts of exemplified compound 1-1, compound represented by Formula (I), and 8 parts of N-isopropylacrylamide were dissolved in 28 parts of ethyl acetate. 0.129 parts of 2-mercaptoethanol was added to the resultant solution. Polymerization was carried out in the presence of 0.05 parts of 2,2'-azobis(2,4-dimethylvaleronitrile) (V-65™ manufactured by Wako Pure Chemical Industries, Ltd.,) serving as a polymerization initiator at a surrounding temperature of 70° C. for 7 hours under nitrogen flow. After the completion of the polymerization, the resultant polymer solution was added to 300 parts of hexane to precipitate a product. As a result, 28.0 parts of exemplified polymer 2-17 was produced by radical polymerization of the above-mentioned compound 1-1 and N -isopropylacrylamide (yield: 86%).

Synthetic Example 5

7.5 parts of exemplified compound 1-1, compound represented by Formula (I), and 2.5 parts of N-acryloylpyrrolidine were dissolved in 8 parts of ethyl acetate. 0.033 parts of 2-mercaptoethanol was added to the resultant solution. Polymerization was carried out in the presence of 0.02 parts of 2,2'-azobis(2,4-dimethylvaleronitrile) (V-65™ manufactured by Wako Pure Chemical Industries, Ltd.,) serving as a polymerization initiator at a surrounding temperature of 70° C. for 7 hours under nitrogen flow. After the completion of the polymerization, the resultant polymer solution was added to 100 parts of hexane to precipitate a product. As a result, 9.5 parts of exemplified polymer 2-18 was be produced by radical polymerization of the above-mentioned compound 1-1 and N -acryloylpyrroline (yield: 95%).

Synthetic Example 6

15 parts of exemplified compound 1-1, compound represented by Formula (I), and 1.67 parts of acrylamide were dissolved in 16 parts of 1-methoxy-2-propanol. 0.133 parts of 2-mercaptoethanol was added to the resultant solution. Polymerization was carried out in the presence of 0.05 parts of 2,2'-azobis(2-methyl-N-(2-hydroxyethyl)propionamide) (V -86™ manufactured by Wako Pure Chemical Industries, Ltd.,) serving as a polymerization initiator at a surrounding temperature of 120° C. for 5 hours under nitrogen flow. After the completion of the polymerization, the resultant polymer solution was added to 100 parts of hexane to precipitate a product. As a result, 15.5 parts of exemplified polymer 2-30 was produced by radical polymerization of the above-mentioned compound 1-1 and acrylamide (yield: 93%).

Synthetic Example 7

12 parts of exemplified compound 1-21 (Blenmer 4000™ manufactured by Nippon Oil & Fats Co., Ltd.,), compound represented by Formula (I), and 3.19 parts of N-ethylacrylamide were dissolved in 15 parts of 1-methoxy-2-propanol. 0.156 parts of 2-mercaptoethanol was added to the resultant solution. Polymerization was carried out in the presence of 0.05 parts of 2,2'-azobis(2-methyl-N-(2-hydroxyethyl)propionamide) (V-86™ manufactured by Wako Pure Chemical Industries, Ltd.,) serving as a polymerization initiator at a surrounding temperature of 120° C. for 5 hours under nitrogen flow. After the completion of the polymerization, the resultant polymer solution was added to 100 parts of hexane to precipitate a product. As a result, 15.0 parts of exemplified polymer 2-31 was produced by radical polymerization of the above-mentioned compound 1-21 and N -ethylacrylamide (yield: 99%).

Synthetic Example 8

15.2 parts of exemplified compound 1-21 (Blenmer 4000™ manufactured by Nippon Oil & Fats Co., Ltd.,), compound represented by Formula (I), and 0.8 parts of acrylamide were dissolved in 16 parts of 1-methoxy-2-propanol. 0.328 parts of 2-mercaptoethanol was added to the resultant solution. Polymerization was carried out in the presence of 0.02 parts of 2,2'-azobis(2-methyl-N-(2-hydroxyethyl)propionamide) (V -86™ manufactured by Wako Pure Chemical Industries, Ltd.,) serving as a polymerization initiator at a surrounding temperature of 120° C. for 5 hours under nitrogen flow. After the completion of the polymerization, the resultant polymer solution was added to 100 parts of hexane to precipitate a product. As a result, 15.4 parts of exemplified polymer 2-33 was produced by radical polymerization of the above-mentioned compound 1-21 and acrylamide (yield: 96%).

Synthetic Example 9

15 parts of exemplified compound 1-1, compound represented by Formula (I), 1.18 parts of N-ethylacrylamide, and 0.354 parts of acrylamide were dissolved in 16 parts of 1-methoxy-2-propanol. 0.118 parts of 2-mercaptoethanol was added to the resultant solution. Polymerization was carried out in the presence of 0.05 parts of 2,2'-azobis(2-methyl-N-(2-hydroxyethyl)propionamide) (V-86™ manufactured by Wako Pure Chemical Industries, Ltd.,) serving as a polymerization initiator at a surrounding temperature of 120° C. for 5 hours under nitrogen flow. After the completion of the polymerization, the resultant polymer solution was added to 100 parts of hexane to precipitate a product. As a result, 15.0 parts of exemplified polymer 3-1 was produced by radical polymerization of the above-mentioned compound 1-1, N-ethylacrylamide and acrylamide (yield: 90%).

Synthetic Example 10

15 parts of exemplified compound 1-1, compound represented by Formula (I), 1.53 parts of N-ethylacrylamide, and 0.153 parts of N -methylacrylamide were dissolved in 16 parts of 1-methoxy-2-propanol. 0.153 parts of 2-mercaptoethanol was added to the resultant solution. Polymerization was carried out in the presence of 0.05 parts of 2,2'-azobis (2-methyl-N-(2-hydroxyethyl)propionamide) (V-$_{86}$™ manufactured by Wako Pure Chemical Industries, Ltd.,) serving as a polymerization initiator at an outer temperature of 120° C. for 5 hours under nitrogen flow. After the completion of the polymerization, the resultant polymer solution was added to 100 parts of hexane to precipitate a product. As a result, 15.6 parts of exemplified polymer 3-2 was produced by radical polymerization of the above-mentioned compound 1-1, N -ethylacrylamide and N-methylacrylamide (yield: 93%).

Synthetic Example 11

15 parts of exemplified compound 1-21, compound represented by Formula (I), 2.19 parts of N-methylacrylamide, and 0.754 parts of acrylamide were dissolved in 16 parts of 1-methoxy-2-propanol. 0.075 parts of 2-mercaptoethanol was added to the resultant solution. Polymerization was carried out in the presence of 0.05 parts of 2,2'-azobis(2-methyl-N-(2-hydroxyethyl)propionamide) (V-86™ manufactured by Wako Pure Chemical Industries, Ltd.,) serving as a polymerization initiator at a surrounding temperature of 120° C. for 5 hours under nitrogen flow. After the completion of the polymerization, the resultant polymer solution was added to 100 parts of hexane to precipitate a product. As a result, 17.1 parts of exemplified polymer 3-3 was produced by radical polymerization of the above-mentioned compound 1-21, N-methylacrylamide and acrylamide (yield: 95%).

(I) Preparation of Isocyanate Composition

Example 1

10 parts of polymer 2-1 obtained in Synthetic Example 1 was dried with a vacuum pump for 2 hours at a surrounding temperature of 80° C. The polymer was cooled down to room temperature. 16.7 parts of dried acetonitrile and 13.3 parts of a 75% ethyl acetate solution of xylylenediisocyanate/trimethylolpropane adduct (Takenate D110N™ manufactured by Mitsui Takeda Chemicals, Ltd.) were added to the polymer, and the resultant mixture was stirred at 60° C. for 4 hours under nitrogen flow. As a result, a 50% solution of an objective isocyanate composition (1) was obtained.

Example 2

A 50% solution of an isocyanate composition (2) was obtained in the same manner as in Example 1, except that polymer 2-15 obtained in Synthetic Example 2 was used instead of polymer 2-1.

Example 3

A 50% solution of an isocyanate composition (3) was obtained in the same manner as in Example 1, except that polymer 2-16 obtained in Synthetic Example 3 was used instead of polymer 2-1.

Example 4

A 50% solution of an isocyanate composition (4) was obtained in the same manner as in Example 1, except that polymer 2-17 obtained in Synthetic Example 4 was used instead of polymer 2-1.

Example 5

A 50% solution of an isocyanate composition (5) was obtained in the same manner as in Example 1, except that polymer 2-18 obtained in Synthetic Example 5 was used instead of polymer 2-1.

Example 6

10 parts of polymer 2-15 obtained in Synthetic Example 2 was dried with a vacuum pump for 2 hours at a surrounding temperature of 80° C. The polymer was cooled down to room temperature. Twenty parts of dried acetonitrile and 10 parts of m-xylylenediisocyanate were added to the polymer, and the resultant mixture was stirred at 60° C. for 4 hours under nitrogen flow. As a result, a 50% solution of an objective isocyanate composition (6) was obtained.

Example 7

10 parts of polymer 2-15 obtained in Synthetic Example 2 was dried with a vacuum pump for 2 hours at a surrounding temperature of 80° C. The polymer was cooled down to room temperature. Twenty parts of dried acetonitrile and 10 parts of hexamethylenediisocyanate were added to the polymer, and the resultant mixture was stirred at 60° C. for 4 hours under nitrogen flow. As a result, a 50% solution of an objective isocyanate composition (7) was obtained.

Example 8

10 parts of polymer 2-15 obtained in Synthetic Example 2 was dried with a vacuum pump for 2 hours at a surrounding temperature of 80° C. The polymer was cooled down to room temperature. Twenty parts of dried acetonitrile and 10 parts of 4-tolylenediisocyanate were added to the polymer, and the resultant mixture was stirred at 60° C. for 4 hours under nitrogen flow. As a result, a 50% solution of an objective isocyanate composition (8) was obtained.

Example 9

A 50% solution of an isocyanate composition (9) was obtained in the same manner as in Example 1, except that polymer 2-30 obtained in Synthetic Example 6 was used instead of polymer 2-1.

Example 10

A 50% solution of an isocyanate composition (10) was obtained in the same manner as in Example 1, except that polymer 2-31 obtained in Synthetic Example 7 was used instead of polymer 2-1.

Example 11

A 50% solution of an isocyanate composition (11) was obtained in the same manner as in Example 1, except that polymer 2-33 obtained in Synthetic Example 8 was used instead of polymer 2-1.

(II) Preparation of Microcapsule Liquid for Thermosensitive Recording Layer (A)

Example 12

(1) Preparation of Diazonium Salt-encapsulating Microcapsule Liquid 3.5 parts of diazonium salt (A-1) and 0.9 parts of diazonium salt (A-2) shown below and having a maximum absorption wavelength of 420 nm were dissolved in 16.4 parts of ethyl acetate. 7.3 parts of isopropyl biphenyl and 2.5 parts of diphenyl phthalate serving as organic solvents having a high boiling point were added to the resultant solution, and the resultant mixture was heated and homogeneously stirred.

Diazonium salt (A-1)

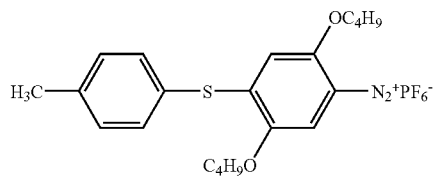

Diazonium salt (A-2)

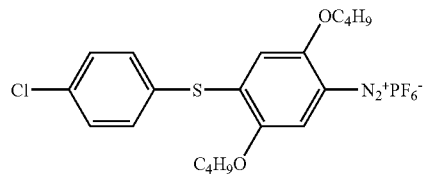

5.0 parts of a 75% ethyl acetate solution of xylylenediisocyanate/trimethylolpropane adduct (Takenate D110N™ manufactured by Mitsui Takeda Chemicals, Ltd.) was mixed with 13.0 parts of a 30% ethyl acetate solution of xylylenediisocyanate/bisphenol A adduct, prepared according to the method disclosed in JP-A No. 5-233536. 5.3 parts of the resultant mixture, and 4.5 parts of the isocyanate composition (2) of Example 2, which were capsule wall-forming agents, were added to the whole amount of the diazonium salt mixture described above, and the resultant mixture was stirred to homogenize. 77 parts of an 8% phthalated gelatin aqueous solution including 4.5 parts of "Scraph AG-8™" manufactured by Nippon Fine Chemical Co., was separately prepared. The above mixture including the diazonium salt compounds and the capsule wall-forming agents was emulsification-dispersed in the aqueous solution with a homogenizer. Twenty parts of water was added to the resultant emulsion-dispersion liquid, and the resultant mixture was homogenized. Thereafter, capsule-forming reaction was carried out while the mixture was being stirred at 40° C. for 3 hours. The reaction mixture was cooled down to 35° C. 4.1 parts of Amberlite IRA$_{68}$™ and 8.2 parts of Amberlite IRC50™ manufactured by Organo Corporation and serving as ion exchange resins were added to the mixture and the resultant mixture was stirred for one hour. The mixture was filtrated to remove the ion exchange resins. Then, the concentration of solid components in the resultant capsule liquid was adjusted at 20%. Thus, a diazonium salt-encapsulating microcapsule liquid was obtained. The median diameter of the microcapsules was measured with a particle size distribution measurement apparatus (LA-700™ manufactured by Horiba, Ltd.), and found to be 0.36 μm.

Example 13

A diazonium salt-encapsulating microcapsule liquid was obtained in the same manner as in Example 12, except that, as a capsule wall forming agent, the isocyanate composition (3) of Example 3 was used instead of the isocyanate composition (2) of Example 2. The median diameter of the microcapsules in the capsule liquid was 0.39 μm.

Example 14

A diazonium salt-encapsulating microcapsule liquid was obtained in the same manner as in Example 12, except that, as capsule wall-forming agents, 5.0 parts of a 75% ethyl acetate solution of xylylenediisocyanate/trimethylolpropane adduct (Takenate D110N™ manufactured by Mitsui Takeda Chemicals, Ltd.), and 13.0 parts of a 30% ethyl acetate solution of xylylenediisocyanate/bisphenol A adduct prepared according to the method disclosed in JP-A No. 5-233536, and 0.86 parts of the isocyanate composition (4) of Example 4 were added to 9.0 parts of the mixture including the diazonium salt compounds. The median diameter of the microcapsules in the capsule liquid was 0.53 μm.

Example 15

A diazonium salt-encapsulating microcapsule liquid was obtained in the same manner as in Example 14, except that, as a capsule wall forming agent, the isocyanate composition (5) of Example 5 was used instead of the isocyanate composition (4) of Example 4. The median diameter of the microcapsules in the capsule liquid was 0.49 μm.

Example 16

A diazonium salt-encapsulating microcapsule liquid was obtained in the same manner as in Example 12, except that, as a capsule wall forming agent, the isocyanate composition (9) of Example 9 was used instead of the isocyanate composition (2) of Example 2. The median diameter of the microcapsules in the capsule liquid was 0.39 μm.

Example 17

A diazonium salt-encapsulating microcapsule liquid was obtained in the same manner as in Example 12, except that, as a capsule wall forming agent, the isocyanate composition (10) of Example 10 was used instead of the isocyanate composition (2) of Example 2. The median diameter of the microcapsules in the capsule liquid was 0.37 μm.

Example 18

A diazonium salt-encapsulating microcapsule liquid was obtained in the same manner as in Example 12, except that, as a capsule wall forming agent, the isocyanate composition (11) of Example 11 was used instead of the isocyanate composition (2) of Example 2. The median diameter of the microcapsules in the capsule liquid was 0.33 μm.

(III) Preparation of Thermosensitive Recording Material and Evaluation Test Therefor

Example 19

(2) Preparation of Coupler Emulsion-dispersion Liquid 2.4 parts of 2,5-di-n-heptyloxyacetoanilide, 2.5 parts of triphenylguanidine, 3.3 parts of 4-(2-ethylhexyloxy)phenylsulfonamide, 1.7 parts of 4-n-pentyloxyphenylsulfonamide and 5.0 parts of 4,4'-(m-phenylenediisopropylidene)diphenol serving as coupler compounds were dissolved in 8.0 parts of ethyl acetate. 1.0 parts of Pionin A41C™ manufactured by Takemoto Oil & Fat Co., Ltd. was added to the resultant solution and the resulting mixture was heated and homogeneously stirred. 75.0 parts of a 10% aqueous solution of gelatin (#750 Gelatin™ manufactured by Nitta Gelatin Ltd.,) was separately prepared, and the above-described solution was added to the aqueous solution of gelatin, and emulsification-dispersed therein with a homogenizer at 40° C. Residual ethyl acetate was evaporated from the resultant emulsion-dispersion liquid to adjust the concentration of solid components in the liquid at 26.5%.

SBR latex (SN-307™ manufactured by Sumika ABS Latex, Co., Ltd., 48% dispersion liquid) was diluted to adjust the concentration at 26.5%. Nine parts of the diluted latex is added to 100 parts of the coupler emulsion-dispersion liquid and the resultant mixture was stirred homogeneously to obtain a coupler emulsion-dispersion liquid.

(3) Preparation of Coating Solution for Thermosensitive Recording Layer (A)

The diazonium salt-encapsulating microcapsule liquid prepared in Example 12 and the coupler emulsion-dispersion liquid were mixed so that the mass ratio of diazonium salt to the coupler compound to be contained became 1/3.2. Thus, an objective coating solution for the thermosensitive recording layer (A) was obtained.

(4) Preparation of Protective Layer for Coating Solution (D)

2.0 parts of a 20.5% dispersion liquid of zinc stearate (Hydrin F115™ manufactured by Chukyo Yushi. Co., Ltd.,), 8.4 parts of a 2% aqueous solution of the following compound (D-1), 8.0 parts of fluorinated releasing agent (ME-313™ manufactured by Daikin Industries, Ltd.,) and 0.5 parts of flour starch (KF-4™ manufactured by Saiden Chemical Industry, Ltd.,) were added to 61 parts of a 5.0% aqueous solution of itaconic acid-modified polyvinyl alcohol (KL-318™ manufactured by Kuraray Co., Ltd.,). The resultant mixture was stirred homogeneously. Thus, a mother liquid was obtained.

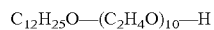  Compound (D-1)

12.5 parts of an aqueous solution of Kaogloss™ manufactured by Shiraishi Kogyo Kabushiki Kaisha and having a concentration of 20%, which had been ion-exchanged, 0.06 parts of Poise 532A™ manufactured by Kao Corporation, 1.87 parts of Hydrin Z-7™ manufactured by Chukyo Yushi. Co., Ltd., 1.25 parts of a 10% aqueous solution of polyvinyl alcohol (PVA105™ manufactured by Kuraray Co., Ltd.,) and 0.39 parts of a 2% aqueous solution of sodium dodecylsulfonate were mixed with each other, and the resultant mixture was microdispersed with Dynomill. Thus, a pigment liquid was obtained.

4.4 parts of the pigment liquid was added to 80 parts of the mother liquid and the resultant mixture was stirred for not less than 30 minutes. Thereafter, 2.8 parts of Wetmaster 500™ manufactured by Toho Chemical Industries, Ltd. was added to the mixture and the resulting mixture was stirred for not less than 30 minutes to obtain an objective coating solution for a protective layer (D).

(5) Preparation of Thermosensitive Recording Material

The coating solution for a thermosensitive recording layer (A) and the coating solution for a protective layer (D) were applied in this order to a surface of a substrate for photographic paper which substrate had a polyethylene layer on woodfree paper with a wire bar, and the resultant coating was dried to obtain a thermosensitive recording material (1) of the invention. In the application, the amounts of solid components in the coating solutions (A) and (D) were 4.5 g/m$^2$ and 1 g/m$^2$, respectively.

(6) Thermal Recording and Evaluation Test

The thermal recording properties of the thermosensitive recording material (1) thus obtained were evaluated with a thermal head (KST TYPE manufactured by Kyocera Corporation) as follows.

(1) The power applied to the thermal head and the pulse width were adjusted so that the recording energy per unit area became 34 mJ/mm$^2$. A yellow image was recorded on the thermosensitive recording material with the thermal head thus adjusted. p0 (2) The recording material was irradiated with light from an ultraviolet lamp having an emission central wavelength of 420 nm and a power of 40 W for 10 seconds to fix the image and to deactivate the diazonium salts in non-irradiated portions of the recording material. In order to measure the developing density, the optical reflection density of the image portions of the yellow image was measured with a Macbeth densitometer (RD918 type). The result is shown in Table 1 as a developing density.

(3) The shelf life (raw stock storability) of the thermosensitive recording material was evaluated by storing the thermosensitive recording material in a thermo-hygrostat kept at 50° C. and 70% RH for 7 days, fixing the thermosensitive recording material which had not been irradiated, and then measuring the optical reflection density of the background portions. The result is shown in Table 1 as a fogging density.

Example 20

A thermosensitive recording material (2) of the invention was prepared in the same manner as in Example 19, except that the microcapsule liquid of Example 13 was used as a diazonium salt-encapsulating microcapsule liquid used in preparation of a coating solution for a thermosensitive recording layer (A) instead of the microcapsule liquid of Example 12.

Example 21

A thermosensitive recording material (3) of the invention was prepared in the same manner as in Example 19, except that the microcapsule liquid of Example 14 was used as a diazonium salt-encapsulating microcapsule liquid used in preparation of a coating solution for a thermosensitive recording layer (A) instead of the microcapsule liquid of Example 12.

Example 22

A thermosensitive recording material (4) of the invention was prepared in the same manner as in Example 19, except that the microcapsule liquid of Example 15 was used as a diazonium salt-encapsulating microcapsule liquid used in preparation of a coating solution for a thermosensitive recording layer (A) instead of the microcapsule liquid of Example 12.

Example 23

A thermosensitive recording material (5) of the invention was prepared in the same manner as in Example 19, except that 2.4 parts of 2,5-di-n-heptyloxyacetoanilide, 1.2 parts of triphenylguanidine and 2.4 parts of 4,4'-(m-phenylenediisopropylidene)diphenol serving as coupler compounds were dissolved in 8.0 parts of ethyl acetate and the resultant mixture was heated and homogeniously stirred in preparation of a coupler emulsion-dispersion liquid. The amount of solid components of the thermosensitive recording layer was 3.2 g/m², and the median diameter of the microcapsules was 0.39 μm.

Example 24

A thermosensitive recording material (6) of the invention was prepared in the same manner as in Example 23, except that the diazonium salt-encapsulating microcapsule liquid of Example 13 was used instead of the diazonium salt-encapsulating microcapsule liquid of Example 12 in preparation of a coating solution for a thermosensitive recording layer (A).

Example 25

A thermosensitive recording material (7) of the invention was prepared in the same manner as in Example 19, except that the diazonium salt-encapsulating microcapsule liquid of Example 16 was used instead of the diazonium salt-encapsulating microcapsule liquid of Example 12 in preparation of a coating solution for a thermosensitive recording layer (A).

Example 26

A thermosensitive recording material (8) of the invention was prepared in the same manner as in Example 19, except that the diazonium salt-encapsulating microcapsule liquid of Example 17 was used instead of the diazonium salt-encapsulating microcapsule liquid of Example 12 in preparation of a coating solution for a thermosensitive recording layer (A).

Example 27

A thermosensitive recording material (9) of the invention was prepared in the same manner as in Example 19, except that the diazonium salt-encapsulating microcapsule liquid of Example 18 was used instead of the diazonium salt-encapsulating microcapsule liquid of Example 12 in preparation of a coating solution for a thermosensitive recording layer (A).

Comparative Example 1

A diazonium salt-encapsulating microcapsule liquid was prepared in the same manner as in Example 12, except that 4.5 parts of a 75% ethyl acetate solution of xylylenediisocyanate/trimethylolpropane adduct (Takenate D110N™ manufactured by Mitsui Takeda Chemicals, Ltd.) was mixed with 4.5 parts of a 30% ethyl acetate solution of xylylenediisocyanate/bisphenol A adduct synthesized according to the method disclosed in JP-A No. 5-233536, and except that 4.3 parts of the resultant mixture, and 4.5 parts of an isocyanate compound (3) synthesized according to Synthetic method 3 disclosed in JP-A 10-114153 serving as capsule wall-forming agents were added to the mixture including the diazonium salts in preparation of a diazonium salt-encapsulating microcapsule liquid, and except that the isocyanate composition (2) was not used.

Next, a thermosensitive recording material (10) of Comparative Example 1 was prepared in the same manner as in Example 19, except that the thus prepared diazonium salt-encapsulating microcapsule liquid was used instead of the diazonium salt-encapsulating microcapsule liquid of Example 12 in preparation of a coating liquid for a thermosensitive recording layer (A).

Comparative Example 2

A diazonium salt-encapsulating microcapsule liquid was prepared in the same manner as in Example 12, except 4.5 parts of an isocyanate compound (3) synthesized according to Synthetic method 3 disclosed in JP-A 10-114153 serving as a capsule wall-forming agent was used instead of the isocyanate composition (2) in preparation of a coating liquid for a thermosensitive recording layer (A).

Next, a thermosensitive recording material (11) of Comparative Example 2 was prepared in the same manner as in Example 19, except that the thus prepared diazonium salt-encapsulating microcapsule liquid was used instead of the diazonium salt-encapsulating microcapsule liquid of Example 12 in preparation of a coating liquid for a thermosensitive recording layer (A).

The developing density of the image portions and the fogging density of the non-image portions of each of the thermosensitive recording materials of Examples 20 to 27 and Comparative Examples 1 and 2 were evaluated in the same manner as in Example 19. The results are shown in Table 1.

TABLE 1

|  | Developing density | Fogging density |
| --- | --- | --- |
| Example 19 | 1.15 | 0.13 |
| Example 20 | 1.14 | 0.12 |
| Example 21 | 1.03 | 0.12 |
| Example 22 | 1.04 | 0.11 |
| Example 23 | 1.08 | 0.13 |
| Example 24 | 1.02 | 0.14 |
| Example 25 | 0.99 | 0.12 |
| Example 26 | 1.05 | 0.13 |
| Example 27 | 1.04 | 0.13 |
| Comparative Example 1 | 0.90 | 0.14 |
| Comparative Example 2 | 0.98 | 0.51 |

As is apparent from the results in Table 1, it has been found that the thermosensitive recording materials which include microcapsules made from at least one raw material including the isocyanate compositions of the invention (Examples 19 to 27) have a higher developing density in image portions and a lower fogging density in background portions than that of Comparative Example 1 and that they are excellent in developing properties and raw stock storability. The thermosensitive recording material of Comparative Example 2 had an increased developing density, but also had an increased fogging density. Therefore, the recording material of Comparative Example 2 cannot be put into practical use.

(IV) Multicolor Thermosensitive Recording Material and Evaluation Test

Example 28

Preparation of Coating Solution for Thermosensitive Recording Layer (B)

2.8 parts of the following diazonium salt (B-1) having a maximum absorption wavelength of 365 nm serving as a diazonium salt compound, 2.8 parts of dibutyl sulfate and 0.56 parts of 2,2-dimethoxy-1,2-diphenylethan-1-one (Irgacure 651™ manufactured by Ciba Geigy Corporation) were dissolved in 10.0 parts of ethyl acetate. In addition, 5.9 parts of isopropylbiphenyl and 2.5 parts of tricresyl phosphonate serving as solvents having a high boiling point were added to the resultant solution, and the resulting mixture was heated and homogeneously stirred.

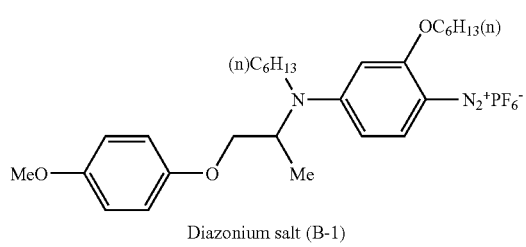

Diazonium salt (B-1)

7.6 parts of a 75% ethyl acetate solution of xylylenediisocyanate/trimethylolpropane adduct (Takenate D110N™ manufactured by Mitsui Takeda Chemicals, Ltd. serving as a capsule wall-forming agent was added to the abovementioned mixture and the resultant mixture was mixed homogeneously. Sixty-four parts of a 6% aqueous solution of gelatin (MGP-9066™ manufactured by Nippi Gelatin Industries, Ltd.) including 2.0 parts of a 10% aqueous solution of sodium dodecylsulfonate was prepared separately. The mixture including the diazonium salt compound was added to the solution, and the resultant mixture was stirred with a homogenizer.

(3) Reaction for Forming Capsules

Twenty parts of water was added to the resultant emulsion-dispersion liquid, and the resultant mixture was homogenized. The components of the mixture were reacted at 40° C. for 30 minutes, while the mixture was being stirred. The mixture was heated to 60° C., and the components were reacted for 3 hours to form capsules. The reaction system was cooled down to 35° C. 4.1 parts of Amberlite IRA68™ and 8.2 parts of Amberlite IRC50™ manufactured by Organo Corporation and serving as ion exchange resins were added to the system, and the resultant mixture was stirred for one hour. The mixture was then filtered to remove the ion exchange resins. Thus, an objective diazonium salt-encapsulating capsule liquid was obtained. The average diameter of the capsules was 0.63 μm.

(4) Preparation of Coupler Emulsion-dispersion Liquid 3.0 parts of compound (B-2) shown below, 8.0 parts of triphenylguanidine, 8.0 parts of 1,1-(p-hydroxyphenyl)-2-ethylhexane, 8.0 parts of 4,4'-(p-phenylenediisopropylidene)diphenol, 2.0 parts of compound (B-3) shown below and 2.0 parts of 1,1,3-tris(2-methyl-4-hydroxy-5-t-butylphenyl)butane serving as coupler compounds were dissolved in 10.5 parts of ethyl acetate. 0.48 parts of tricresyl phosphate, 0.24 parts of diethyl and 1.27 parts of Pionin A41C™ manufactured by Takemoto Oil & Fat Co., Ltd. were added to the resultant solution, and the resulting mixture was heated and homogeneously stirred. The mixture was emulsification-dispersed in 93 parts of an 8% aqueous solution of gelatin (#750 Gelatin™ manufactured by Nitta Gelatin Ltd.) with a homogenizer. The residual ethyl acetate was evaporated from the emulsion-dispersion liquid to obtain an objective coupler emulsion-dispersion liquid.

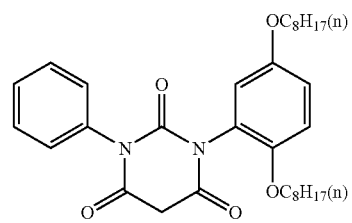

Compound (B-2)

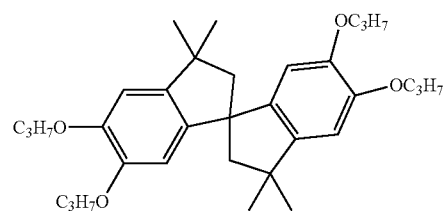

Compound (B-3)

Preparation of Coating Solution for Thermosensitive Recording Layer (C)

(4) Preparation of Electron-Donating Dye Precursor-Encapsulating Microcapsule Liquid 0.39 parts of 3-(o-methyl-p-diethylaminophenyl)-3-(1'-ethyl-2-methylindol-3-yl)phthalide serving as an electron-donating dye precursor, 0.19 parts of 2-hydroxy-4-methoxybenzophenone having a maximum absorption wavelength of 285 nm serving as an ultraviolet absorbent and 0.29 parts of 2,5-tert-octylhydroquinone serving as an antioxidant were dissolved in 0.93 parts of ethyl acetate. 0.54 parts of phenethylcumene was added to the resultant solution as a solvent having a high boiling point, and the resultant solution was heated and homogeneously stirred. 1.0 parts of a 75% ethyl acetate solution of xylylenediisocyanate/trimethylolpropane adduct (Takenate D110N™ manufactured by Mitsui Takeda Chemicals, Ltd.) serving as a capsule wall-forming agent was added to the solution and the resultant mixture was stirred homogeneously.

36.4 parts of a 6% aqueous solution of gelatin (MGP-9066™ manufactured by Nippi Gelatin Industries, Ltd.) including 0.07 parts of a 10% aqueous solution of sodium dodecylsulfonate was prepared separately, and the solution including the electron-donating dye precursor was emulsification-dispersed in this solution with a homogenizer. Thus, a "primary emulsion-dispersion liquid" was obtained.

Meanwhile, 6.0 parts of 3-(o-methyl-p-diethylaminophenyl)-3-(1'-ethyl-2-methylindol-3-yl)phthalide, 3.0 parts of 2-hydroxy-4-methoxybenzophenone and 4.4 parts of 2,5-tert-octylhydroquinone were dissolved in 14.4 parts of ethyl acetate. 8.4 parts of phenethylcumene serving as a solvent having a high boiling point was added to the resultant solution, and the mixture was stirred homogeneously. 7.8 parts of Takenate D110N™, which had been used above, and 5.9 parts of methylenediisocyanate (Millionate MR200™ manufactured by Nippon Polyurethane Industries, Ltd.,) were added to the above mixture, and the resultant mixture was stirred homogeneously. The solution thus obtained and 1.2 parts of a 10% aqueous solution of sodium dodecylsulfonate were added to the primary emulsion-dispersion liquid, and the oil phase of the resultant system was emulsification-dispersed in the aqueous phase thereof with a homogenizer. The resultant system is referred to as a "secondary emulsion-dispersion liquid". 60.0 parts of water and 0.4 parts of diethylenetriamine were added to the secondary emulsion-dispersion liquid, and the resultant mixture was homogenized. The mixture was heated to 65° C. while the mixture was being stirred. Then, a reaction for forming microcapsules was carried out for 3.5 hours to give an objective electron-donating dye precursor-encapsulating microcapsule liquid. The average diameter of the capsules was 1.9 μm.

(5) Preparation of Electron-accepting Compound Emulsion-dispersion Liquid

Thirty parts of Bisphenol P serving as an electron-accepting compound was added to 82.5 parts of a 2.0% aqueous solution of gelatin (MGP-9066™ manufactured by Nippi Gelatin Industries, Ltd.,). 7.5 parts of a 2% aqueous solution of sodium 2-ethylhexylsulfosuccinate was added to the resultant solution, and the obtained mixture was stirred in a ball mill for 24 hours to prepare a dispersion liquid. 36.0 parts of 15% aqueous solution of gelatin (#750 Gelatin™ manufactured by Nitta Gelatin Ltd.,) was added to the dispersion liquid and the resultant was stirred homogeneously to obtain an objective electron-accepting compound dispersion liquid. The average diameter of the electron-accepting compound in the dispersion liquid was 0.5 μm.

(6) Preparation of Coating Solution

The electron-donating dye precursor-encapsulating microcapsule liquid, the electron-accepting compound emulsion dispersion liquid, a 15% aqueous solution of gelatin (#750 Gelatin™ manufactured by Nitta Gelatin Ltd.) and a stilbene fluorescent brightener (Whitex-BB™ manufactured by Sumitomo Chemical Co., Ltd.) were mixed so that the mass ratio of electron-donating dye precursor/electron-accepting compound became 1/14 and so that the mass ratio of electron-donating dye precursor/#750 Gelatin became 1.1/1 and so that the mass ratio of electron-donating dye precursor/fluorescent brightener became 5.3/1. Thus, a coating solution for a thermosensitive recording layer (C) was prepared.

(7) Preparation of Coating Solution for Intermediate Layer (E)

8.2 parts of a 4% aqueous solution of boric acid, 1.2 parts of a 2% aqueous solution of sodium (4-nonylphenoxytrioxyethylene)butylsulfonate, and 7.5 parts of a 2% aqueous solution of the following compound (E-1) were added to a 14% aqueous solution of gelatin (#750 Gelatin™ manufactured by Nitta Gelatin Ltd.) and the resultant mixture was stirred homogeneously to obtain a coating solution for an intermediate layer (E).

(CH$_3$CH$_2$SO$_2$CH$_2$CONHCH$_2$)$_2$  Compound (E-1)

(8) Preparation of Multicolor Thermosensitive Recording Material

The coating solution for a thermosensitive recording layer (C), the coating solution for an intermediate layer (E), the coating solution for a thermosensitive recording layer (B), the coating solution for an intermediate layer (E), and the coating solution for a thermosensitive recording layer (A) and the coating solution for a protective layer (D) used in Example 19 were applied to a surface of a substrate for photographic paper in which polyethylene had been laminated on woodfree paper in this order with a wire bar to obtain a multicolor thermosensitive recording material of the invention. In the above-mentioned application, the amounts of the solid components of the coating solution for a thermosensitive recording layer (C), the coating solution for an intermediate layer (E), the coating solution for a thermosensitive recording layer (B), the coating solution for an intermediate layer (E), the coating solution for a thermosensitive recording layer (A), and the coating solution for a protective layer (D) were 9 g/m$^2$, 3 g/m$^2$, 8 g/m$^2$, 3 g/m$^2$, 4.5 g/m$^2$ and 1 g/m$^2$, respectively.

(9) Thermal Recording and Evaluation Test

The thermal recording properties of the multicolor thermosensitive recording material were evaluated with a thermal head (KST TYPE) manufactured by Kyocera Corporation as follows.

(1) The power applied to the thermal head and the pulse width were adjusted so that the recording energy per unit area became 35 mJ/mm$^2$. A yellow image was recorded on the thermosensitive recording material with the thermal head thus adjusted.

(2) The recording material was irradiated with light from an ultraviolet lamp having an emission central wavelength of 420 nm and a power of 40 W for 10 seconds.

(3) The power applied to the thermal head and the pulse width were adjusted so that the recording energy per unit area became 80 mJ/mm². A magenta image was recorded on the thermosensitive recording material with the thermal head thus adjusted.

(4) The recording material was irradiated with light from an ultraviolet lamp having an emission central wavelength of 365 nm and a power of 40 W for 15 seconds.

(5) The power applied to the thermal head and the pulse width were adjusted so that the recording energy per unit area became 140 mJ/mm². A cyan image was recorded on the thermosensitive recording material with the thermal head thus adjusted.

As a result, yellow, magenta and cyan images were formed. Moreover, a red image was formed in a printed portion in which yellow and magenta images overlapped with each other, a blue image was formed in a printed portion in which magenta and cyan images overlapped with each other, a green image was formed in a printed portion in which yellow and cyan images overlapped with each other, and a black image was formed in a printed portion in which yellow, magenta and cyan images overlapped with each other. The portions on which no image had been printed was grayish white. The optical reflection densities of yellow, magenta and cyan images were measured with a densitometer, Macbeth RD918 type. The results are shown in Table 2 as developing densities.

The shelf life (raw stock storability) was evaluated by storing each of the thermosensitive recording materials in a thermo-hygrostat at 40° C. and 90% RH for 24 hours, fixing the images on the thermosensitive recording material, and measuring the optical reflection density of the background portion of each thermosensitive recording material. The results are shown in Table 2 as fogging densities.

Example 29

A multicolor thermosensitive recording material of the invention was prepared and evaluated in the same manner as in Example 28, except that the diazonium salt-encapsulating capsule liquid of Example 13 was used as a diazonium salt-encapsulating capsule liquid for a thermosensitive recording layer (A). The results are shown in Table 2.

TABLE 2

|  | Developing density of image portion | | | Fogging density of |
|---|---|---|---|---|
|  | Yellow | Magenta | Cyan | non-image portion |
| Example 28 | 1.05 | 1.00 | 1.20 | 0.12 |
| Example 29 | 0.95 | 0.95 | 1.20 | 0.10 |

As is apparent from the results in the Table 2, it has been found that the thermosensitive recording materials which include microcapsules made from at least one raw material including the isocyanate composition of the invention (Examples 28 and 29) have a high developing density of each yellow, magenta and cyan image portions and a low fogging density of a background portion, and that they are excellent in developing properties and raw stock storability.

What is claimed is:

1. An isocyanate composition comprising an adduct of a multifunctional isocyanate compound having two or more isocyanate groups in the molecule thereof with a polymer obtained by radically polymerizing in the presence of a chain transfer agent comprising active hydrogen at least a vinyl monomer comprising a polymerizable compound comprising a polyether represented by the following Formula (I):

$$A^1\text{-}(L\text{-}O)_n\text{-}B^1 \qquad \text{Formula (I)}$$

wherein $A^1$ represents a group having an ethylenically unsaturated double bond; L represents an alkylene group; $B^1$ represents an alkyl group or an aryl group; and n is an average polymerization degree of the polyether and represents a number of 8 to 300.

2. A microcapsule having a polyurethane and/or polyurea wall, wherein the capsule wall comprises, via a covalent bond, a polymer obtained by radically polymerizing in the presence of a chain transfer agent comprising active hydrogen at least a vinyl monomer comprising a polymerizable compound comprising a polyether represented by the following Formula (I):

$$A^1\text{-}(L\text{-}O)_n\text{-}B^1 \qquad \text{Formula (I)}$$

wherein $A^1$ represents a group having an ethylenically unsaturated double bond; L represents an alkylene group; $B^1$ represents an alkyl group or an aryl group; and n is an average polymerization degree of the polyether and represents a number of 8 to 300.

3. A microcapsule having a polyurethane and/or polyurea wall, made from at least one raw material that include the isocyanate composition of claim 1.

4. The microcapsule of claim 2, wherein the microcapsule encapsulates a diazonium salt compound or an electron-donating dye precursor.

5. The microcapsule of claim 3, wherein the microcapsule encapsulates a diazonium salt compound or an electron-donating dye precursor.

6. A recording material comprising a recording layer comprising microcapsules of claim 2.

7. A recording material comprising a recording layer comprising microcapsules of claim 3.

8. A thermosensitive recording material comprising a substrate, and, on the substrate, a thermosensitive recording layer comprising: a coupler and microcapsules encapsulating a diazonium salt compound; or a developer and microcapsules encapsulating an electron-donating dye precursor; wherein the microcapsules include microcapsules of claim 4.

9. A thermosensitive recording material comprising a substrate, and, on the substrate, a thermosensitive recording layer comprising: a coupler and microcapsules encapsulating a diazonium salt compound; and/or a developer and microcapsules encapsulating an electron-donating dye precursor; wherein the microcapsules include microcapsules of claim 5.

10. A thermosensitive recording material comprising a substrate, and, on the substrate, cyan, magenta and yellow color-forming thermosensitive recording layers, wherein each of the thermosensitive recording layers comprises: a coupler and microcapsules encapsulating a diazonium salt compound; or a developer and microcapsules encapsulating an electron-donating dye precursor; and the microcapsules include microcapsules of claim 4.

11. A thermosensitive recording material comprising a substrate, and, on the substrate, cyan, magenta and yellow color-forming thermosensitive recording layers, wherein each of the thermosensitive recording layers comprises: a coupler and microcapsules encapsulating a diazonium salt compound; or a developer and microcapsules encapsulating an electron-donating dye precursor; and the microcapsules include microcapsules of claim 5.

12. A method of producing microcapsules having polyurethane and/or polyurea walls, comprising: causing the isocyanate composition of claim 1 to react with a compound having at least one active hydrogen atom.

13. The method of claim 12, wherein the compound having at least one active hydrogen atom includes two or more active hydrogen atoms.

* * * * *